US011848928B2

(12) United States Patent
McGough

(10) Patent No.: US 11,848,928 B2
(45) Date of Patent: Dec. 19, 2023

(54) PARTICIPANT-MANAGED, INDEPENDENT-TRUST AUTHENTICATION SERVICE FOR SECURE MESSAGING

(71) Applicant: Qwyit LLC, Vienna, VA (US)

(72) Inventor: R Paul McGough, Manassas, VA (US)

(73) Assignee: Qwyit LLC, Great Falls, VA (US)

( * ) Notice: Subject to any disclaimer, the term of this patent is extended or adjusted under 35 U.S.C. 154(b) by 79 days.

(21) Appl. No.: 17/196,640

(22) Filed: Mar. 9, 2021

(65) Prior Publication Data

US 2021/0367941 A1 Nov. 25, 2021

Related U.S. Application Data

(60) Provisional application No. 63/028,203, filed on May 21, 2020.

(51) Int. Cl.
| | |
|---|---|
| *H04L 9/40* | (2022.01) |
| *H04L 9/06* | (2006.01) |
| *H04L 9/08* | (2006.01) |
| *H04L 9/30* | (2006.01) |
| *G09C 1/00* | (2006.01) |

(52) U.S. Cl.
CPC ............ *H04L 63/0869* (2013.01); *G09C 1/00* (2013.01); *H04L 9/0618* (2013.01); *H04L 9/0631* (2013.01); *H04L 9/0656* (2013.01); *H04L 9/0662* (2013.01); *H04L 9/0861* (2013.01); *H04L 9/0869* (2013.01); *H04L 9/3033* (2013.01); *H04L 9/3066* (2013.01); *H04L 63/0478* (2013.01); *H04L 63/0884* (2013.01); *H04L 2209/12* (2013.01)

(58) Field of Classification Search
CPC ............ H04L 63/0869; H04L 63/0478; H04L 63/0884; H04L 9/0861; H04L 63/0435; H04L 9/0631
See application file for complete search history.

(56) References Cited

U.S. PATENT DOCUMENTS

| | | | | |
|---|---|---|---|---|
| 6,002,769 | A * | 12/1999 | McGough | ............ H04L 9/0861 380/42 |
| 6,445,797 | B1 * | 9/2002 | McGough | ............ H04L 9/0631 380/278 |
| 11,277,444 | B2 * | 3/2022 | Kim | ..................... H04L 9/0897 |
| 2006/0034456 | A1 * | 2/2006 | McGough | ............ H04L 9/0891 380/30 |
| 2016/0112381 | A1 * | 4/2016 | Bhattacharyya | .... H04L 63/0428 713/171 |

OTHER PUBLICATIONS

Qwyit Authentication and Encryption Service (QwyitTalk™) Security as a Service Reference Guide Version 2.3 Mar. 14, 2018 (Year: 2018).*

* cited by examiner

*Primary Examiner* — Noura Zoubair
*Assistant Examiner* — Thomas A Carnes
(74) *Attorney, Agent, or Firm* — Michael P. Fortkort, Esq.; MICHAEL P FORTKORT PC

(57) ABSTRACT

An anonymous authentication service for an invulnerable secret key authentication and encryption token distribution service. Applications place a small code segment within their communications protocol, thereby allowing network participants the full benefit of perfectly secure authenticated and encrypted message traffic without concern for third party key management. This is the world's first participant-managed, independent-trust secure messaging key distribution capability.

19 Claims, 5 Drawing Sheets

*QwyitKey™ Registration - Anonymous Set Up (QAASU)*

QwyitKey Client

Initial operation: Make QAASU Request (online at qwyit.com, etc.), then input selected ASK OpenID/MQK/MEK then send Confirmation, including AID Step 5 (ASUC5) Check the public AID with the created AID Step 1 Client Request (ASUC1)
HTTPS request to anonymously register Step 2 QAAS Reply (ASUQ2)
HTTPS display/send of ASK (OpenID/MQK/MEK)

Step 3 Confirmation (ASUC3)
Confirmation wrapped in QwyitCipher w/ASK

QwyitKey Authentication Service/Server (QAAS)

Upon ASU request receipt, generates Qwyit credentials OpenID, ASK (MQK, MEK), display/send to client Step 4 (ASUQ4) Decrypt ASUC3 using OpenID/ASK, check Confirmation Salts, and publish the AID

PARTICIPANT-MANAGED, INDEPENDENT-TRUST AUTHENTICATION SERVICE FOR SECURE MESSAGING

RELATED APPLICATIONS

This application claims priority to U.S. Provisional Patent Application No. 63/028,203 filed May 21, 2020 entitled "Fast Unbreakable Cipher" by the same inventor, which is hereby incorporated by reference as if repeated herein in its entirety, including the drawings.

The present application is related to the following patents and patent applications:

U.S. patent application Ser. No. 08/879,708 filed Jun. 20, 1997 (now U.S. Pat. No. 6,058,189, which issued May 2, 2000) entitled "Method and System for Performing Secure Electronic Monetary Transactions;"

U.S. patent application Ser. No. 08/923,095 filed Sep. 4, 1997 (now U.S. Pat. No. 6,002,769, which issued Dec. 14, 1999) entitled "Method and System for Performing Secure Electronic Messaging," which claimed the benefit of U.S. patent application Ser. No. 08/879,708;

U.S. patent application Ser. No. 09/212,294 filed Dec. 16, 1998 (now U.S. Pat. No. 6,445,797, which issued Sep. 3, 2002) entitled "Method and System for Performing Secure Electronic Digital Streaming;"

U.S. patent application Ser. No. 10/062,312 filed Feb. 1, 2002 entitled "Method and System for Performing Perfectly Secure Key Exchange and Authenticated Messaging;"

U.S. Provisional Application No. 60/563,065 filed Apr. 16, 2004;

U.S. patent application Ser. No. 11/108,347 filed Apr. 18, 2005 entitled "Method and System for Performing Perfectly Secure Key Exchange and Authenticated Messaging," which claimed the benefit of U.S. patent application Ser. No. 10/062,312 and U.S. Provisional Application No. 60/563,065;

U.S. Provisional Application No. 60/842,595 entitled "Real Privacy Management Authentication System" filed Sep. 6, 2006;

U.S. patent application Ser. No. 11/850,948 filed Sep. 6, 2007 (now U.S. Pat. No. 7,899,185, which issued Mar. 1, 2011) entitled "Real privacy management authentication system," which application claimed the benefit of U.S. Provisional Application No. 60/842,595;

U.S. patent application Ser. No. 11/899,741 filed Sep. 6, 2007 (now U.S. Pat. No. 8,144,874), which issued Mar. 27, 2012 and is entitled "Method for Obtaining Key for use in Secure Communications over a Network and Apparatus for Providing Same," which application claimed the benefit of U.S. Provisional Application No. 60/842,595;

U.S. patent application Ser. No. 11/899,742 filed Sep. 6, 2007 (now U.S. Pat. No. 8,144,875), which issued Mar. 27, 2012 and is entitled "Method and System for Establishing Real-Time Authenticated and Secured Communications Channels in a Public Network," which application claimed the benefit of U.S. Provisional Application No. 60/842,595;

U.S. patent application Ser. No. 13/430,253 filed Mar. 26, 2012 (now U.S. Pat. No. 8,649,520), which issued Feb. 11, 2014 and is entitled "Method and System for Real-Time Trust in a Public Network," which application in turn claimed priority to U.S. patent application Ser. No. 11/899,742;

U.S. patent application Ser. No. 14/176,284 filed Feb. 10, 2014, entitled "Method and System for Authentication Over a Public Network Using Multiple Out-of-Band Communications Channels to Send Keys" (now U.S. Pat. No. 9,374,347 issued Jun. 21, 2016) which claimed priority to U.S. patent application Ser. No. 13/430,253;

U.S. Provisional Application No. 62/279,329 filed Jan. 15, 2016 entitled "Method and Apparatus for Streamlined Secure Credit Transaction;"

U.S. patent application Ser. No. 15/188,275 filed Jun. 21, 2016, entitled "Method and System for Authentication Over a Public Network Using Multiple Out-of-Band Communications Channels to Send Keys" (now U.S. Pat. No. 10,498,714 issued Dec. 3, 2019) which claimed priority to U.S. patent application Ser. No. 14/176,284;

U.S. Patent Application No. 62/532,095 filed Jul. 13, 2017, entitled "Method and Apparatus for Authentication and Encryption Service Employing Unbreakable Encryption;"

U.S. Patent Application No. 62/639,737 filed Mar. 7, 2018, entitled "Method and Apparatus for Credit Transaction Employing Unbreakable Encryption;"

U.S. Provisional Application No. 62/660,535 filed Apr. 20, 2018 entitled "Storage and Access Control Service Using Unbreakable Encryption;"

U.S. Provisional Application No. 62/680,897 filed Jun. 5, 2018 entitled "Credit Card Employing Unbreakable Encryption;"

U.S. patent application Ser. No. 16/035,123 (now U.S. Pat. No. 10,924,278 issued Feb. 16, 2021) filed Jul. 13, 2018, entitled "Method and Apparatus for Authentication and Encryption Service Employing Unbreakable Encryption" which claimed priority to U.S. Provisional Patent Application No. 62/532,095; and U.S. patent application Ser. No. 17/165,082 filed Feb. 2, 2021, entitled "Method and Apparatus for Authentication and Encryption Service Employing Unbreakable Encryption" which claimed priority to U.S. patent application Ser. No. 16/035,123;

U.S. patent application Ser. No. 16/295,560 filed Mar. 7, 2019, entitled "Method and Apparatus for Credit Transaction Employing Unbreakable Encryption" which claimed priority to U.S. Provisional Patent Application No. 62/639,737.

All of the foregoing patents and patent applications are hereby incorporated by reference, including the drawings, as if repeated herein in their entirety.

BACKGROUND

There is a fundamental problem with security technologies: they are not used in every communication, and in every digital application. Moreover, security technology is not included in the multiple device architectures across all the various digital networks. If it was, almost all of the problems—from network intrusions and data theft, to financial fraud—would be, if not solved, severely limited. The digital world would mirror the physical one: crime rates below 5%, instead of the unbelievable attacks reported every day.

This is just a common truth. If there was universal, end-to-end network security, there would be minimal criminal activity, limited to inside jobs and local attacks: just like the real world. A digital break-in at Equifax compromised over 140 million records. This is the digital equivalent as if every single bank branch in the entire United States was successfully broken into at the same time. In short, digital security is a complete failure.

Without mutual, constant authenticated and end-to-end encrypted communication, it is easy to 'find your way around'—and then do whatever you want, wherever you are, including digital bad things. But if everything—every digital communication—looked like a foreign language, security is the default. Crime becomes something incredibly difficult, with obvious moral failings; not something anyone can do without even trying.

What is the answer to why everything is not secured? There are two problems, one glaringly apparent and the other quite subtle. First, there's no universal, simple, fits-everywhere method. This is because the current methods are not able to be universal. The defects are that the current methods are too big, too complex, too slow, and just too . . . much.

Second, networks have become multi-dimensional, making end-to-end authentication and encryption impossible using current methods.

We need new security that can solve both these problems.

SUMMARY OF THE INVENTION

The present invention solves these and other problems by providing truly universal constant, mutual authentication and provably secure encryption that fits everywhere across all networks, is always on, and works the same way everywhere.

The present invention, termed herein QwyitKey, comprises an anonymous authentication service, which is the world's first participant-managed, independent-trust authentication service for secure messaging. QwyitKey™ is an implementation capability based on the full Qwyit protocol as described in the aforementioned U.S. patents and patent applications, which have been incorporated by reference as if repeated herein. When discussing the cipher protocol used herein, the present invention employs the cipher as described in U.S. Provisional Patent Application No. 63/028,203 filed May 21, 2020 entitled "Fast Unbreakable Cipher." which has already been incorporated by reference as if repeated herein in its entirety, including the drawings.

According to one aspect of the present invention, an exemplary embodiment of a method for operating an anonymous registration server as part of a participant-managed, independent-trust authentication service for secure messaging comprises an anonymous registration operation and an authentication request operation.

First, the server may perform anonymous registration for any client by receiving a setup request from a client for anonymous registration. Upon receiving the setup request, the server generates client credentials for the client. These client credentials include a client open identification, a client first key and a client second key. These client credentials are then sent to the client. Port 4180 may be used for this send operation. The client generates a confirmation message and sends it to the server. The confirmation message from the client includes the client open identification, a confirmation open return, a client generated authentication identification for publication by the server, and an encrypted confirmation salt generated by the client using a predetermined algorithm, wherein the encrypted confirmation salt is encrypted using the client first key, the client second key and the confirmation open return.

One technique for creating the confirmation salt uses the two client keys in a position digit algebraic function (PDAF) operation to create the confirmation salt. For example, one input to the PDAF could be part of the first client key and a second input could be part of the second client key. Various parts of these keys (e.g., all even digits, all odd digits, etc.) could be used to create the confirmation salt, as long as both the server and client know which part of the keys are being used.

The server decrypts the encrypted confirmation message using the client first key, the client second key and the confirmation open return to reveal the client generated confirmation salt. The server then generates its own confirmation salt using the same predetermined algorithm and the client first key, and the client second key. The server then compares the server generated confirmation salt to the client generated confirmation salt. Upon determining that the server generated confirmation salt matches the sender client generated confirmation salt, the server publishes the client generated authentication identification. This completes the setup process. The client may verify proper publication of its authentication identification as a further confirmation that the setup process worked properly.

The server performs an authentication request operation by receiving an authentication request by a sender client for a recipient-only secure authentication bundle for use in initiating messaging operations between the sender client and a receiver client. The authentication request includes the sender client open identification, an authentication request open return, and a first cipher text. The first cipher text is encrypted using the sender client first key, the sender client second key and the authentication request open return. The first cipher text includes a receiver open identification and a first part of a session start key. Both parts of the session start key are generated by the sender client and only one part becomes known to the server.

The server decrypts the first cipher text using the sender client first key, the sender client second key and the authentication request open return to reveal the receiver client open identification and the first part of a session start key. The server then determines whether the receiver client open identification is valid.

If the receiver client open identification is valid, then the server creates an initialization vector for the sender client and receiver client messaging pair. The server also creates an authentication bundle for the receiver client, which authentication bundle includes the sender client authentication identification, the first part of the session start key, and the initialization vector. The authentication bundle is information intended only for the receiver client; hence it is encrypted using the receiver client's credentials, which the sender client does not know. Thus, the server encrypts the authentication bundle to create an encrypted authentication bundle using a receiver client first key, a receiver client second key, and an authentication bundle open return. The server creates a second cipher text by encrypting the initialization vector, the authentication bundle open return, and the encrypted authentication bundle using the sender client first key, the sender client second key and an authentication reply open return. Then the server sends an authentication reply to the sender client. The authentication reply includes the sender open identification, the authentication reply open return, and the second cipher text. This completes the authentication request operation.

The clients all register with the server. The clients may be any kind of application, app, device or other server that communicates with other registered clients. The first part of the session start key may be generated by the sender client along with a second part of the session start key. The second part of the session start key is not sent to the server. The sender client may receive the authentication reply from the server and then decrypt the second cipher text using the sender client first key, the sender client second key and the authentication reply open return to reveal the initialization vector, the authentication bundle open return, and the encrypted authentication bundle.

The sender client sends an authentication start message to the receiver client. The authentication start message includes the sender open identification, the sender authentication identification, the authentication bundle open return, and the encrypted authentication bundle.

The sender client may perform a modular addition (or an exclusive OR operation) of the second part of the session start key and the initialization vector to obtain an open return authentication. The sender client may send an additional authentication message to the receiver client. The additional authentication message (also known as the authentication authentication message) includes the sender client open identification, the open return authentication, and an encrypted initial message. The sender client encrypts an initial message to obtain the encrypted initial message using the first part of the session start key, the second part of the session start key and the open return authentication.

The sender client may send one authentication start message to the receiver client, which authentication start message includes the sender open identification, the sender authentication identification, the authentication bundle open return, the encrypted authentication bundle, the open return authentication, and an encrypted initial message. The sender client may also encrypt an initial message to obtain the encrypted initial message using the first part of the session start key, the second part of the session start key and the open return authentication.

The receiver client may decrypt the encrypted authentication bundle using the receiver client first key, the receiver client second key, and the authentication bundle open return to reveal the sender authentication identification sent from the server, the first part of the session start key, and the initialization vector. The receiver client may perform an inverse modular addition (or an exclusive OR function) of the open return authentication and the initialization vector to obtain the second part of the session start key. The receiver client decrypts the encrypted initial message using the first part of the session start key, the second part of the session start key and the open return authentication to reveal the initial message.

The sender client and receiver client may subsequently communicate in an encrypted manner encrypting each new message using the first part of the session start key, the second part of the session start key and a new open return for each new message.

The receiver client may compare the sender authentication identification received from the sender client to the sender authentication identification received encrypted from the server in the encrypted authentication bundle.

Alternatively, the receiver client may compare the sender authentication identification received from the sender client and the sender authentication identification received encrypted from the server in the encrypted authentication bundle to a published version of the sender authentication identification that is published by the server in association with the sender open identification.

The receiver client and the sender client may at predetermined key end of lifetimes perform two rounds of a position digit algebraic function (PDAF) operation using the first part of the session start key and the second part of the session start key to create a first part of a client master key, and a second part of a client master key, which are then used in subsequent encryption operations between the sender and receiver clients.

Alternatively, the receiver client and the sender client may at predetermined key end of lifetimes perform four rounds of a position digit algebraic function operation using the first part of the session start key and the second part of the session start key to create double length keys, followed by a one way cut function to create a first part of a client master key, and a second part of a client master key, which are then used in subsequent encryption operations between the sender and receiver clients.

Any client and the server may at predetermined intervals perform two rounds of a position digit algebraic function operation using the client first key and the client second key to create a client first master key, and a client second master key, which are then used in subsequent encryption operations between the client and the server.

Alternatively, any sender client and the server may at predetermined intervals perform four rounds of a position digit algebraic function operation using the sender client first key and the sender client second key to create double length keys, followed by a one way cut function to create a sender client first master key, and a sender client second master key, which are then used in subsequent encryption operations between the sender client and the server.

The aforementioned operations can be embedded in and performed by a central server. The client operations are then performed by any client, app, application, software device, hardware device, mobile computing device or the like.

All of the encrypt decrypt operations in these embodiments are performed by the QCy operation as depicted in FIG. 4 and described herein.

Universal Security

A summary example of the inability of current authentication and encryption methods to proliferate universally can be shown by Transport Layer Security (TLS). The latest version of TLS (V1.3, August 2018), is touted as 'Faster and More Secure' than previous versions because, these are the two things that previous versions were not! Yet, the 'faster' is because there is no longer a need to authenticate even once per session, which is the problem with most network intrusions: nobody authenticates mutually, every transmission, or even every session, just once upon entry . . . then you can sit on the network forever—and steal over 140 million records. TLS V1.3 allows you to authenticate just once initially, and then never again. This is utterly mysterious, because there is nothing new in the V1.3 authentication techniques!

But, it certainly is 'faster', yet exponentially less secure. But . . . the 'more secure' is touted, so what, exactly, does that mean?! It means that TLS V1.3 has removed some of the older, no-longer-supported-because-they-are-instantly-compromised encryption algorithms. This, of course, means that there was not anything added to make it more secure, it is just more secure because you cannot use some insecure components. This is akin to saying that you made your house more secure by throwing away all those extra keys you have accumulated over the years that did not fit the front door.

One aspect of the present invention provides the solution to current methods' inability to be universal. The present invention provides inter alia the world's fastest, smallest, most flexible and provably secure authentication and encryption protocol.

Multidimensional Networks

As evidenced by newer trust models (blockchain, etc.) and the growing communication hardware capabilities (Bluetooth, NFC, etc.), end-to-end network participant authentication and message security in multidimensional networks simply do not work using 'traditional security.'

For instance, a participant in a bank transaction may use their phone, connected to their wireless router by Bluetooth, connected to their wired router, connected to their ISP, connected to a backbone, connected to the bank's entire device architecture, finally connected to their account database—all by different applications, communicating at different OSI levels, with incomprehensible settings, most of which are not accessible by the user, who has a username/password for their authentication, while the actual application message has an increasing number of network connections prior to the destination—each that should require and perform their own authentications. This, of course, is the exact definition of the 'end-to-end security problem.'

The 'original digital network' where asymmetric keyed authentication algorithms and single-keyed encryption ciphers were developed no longer exists—one device logging into a single machine; now there are routers, servers, databases, clouds. It is apparent that network authentication and encryption are never going to be able to continue to use these complex, inefficient methods because they do not work from end-to-end.

U.S. patent application Ser. No. 16/035,123 described QwyitTalk™ to replicate/replace TLS and provide an improved trust model and implementation for software-based secure communications, where 100% of digital security is practiced. In spite of the substantial improvements offered, the dire and deteriorating current state of online security will never be adequately addressed until the 'multidimensional network security discrepancy' is solved: users are anonymous, except to their destination, while their communications need 100% provably secure digital transport.

The perfect example of this conundrum is Bluetooth: a wonderful device communications capability—disparate devices connecting to each other to communicate. Great stuff! Invented as a new, multidimensional network capability—variable, on-the-fly, both short and long-lived, etc. Except, it turns out, the owners and/or content should be authentic and secure. As Bluetooth has expanded and been used in new paradigms, it's become obvious that 'bolting on' current security methods is a complete and utter disaster: Bluetooth security is highly complex and astoundingly inefficient, insecure and, well . . . useless.

Since the protocol of the present invention was designed for flexible implementation, along with our other products that compete directly with current protocols—and improve them by an order of magnitude—the present invention provides for hardware (QwyitChip™) or software (QwyitSDK™) implementations as two universal, identical operating data encryption products.

These perform QwyitCipher™ (QC™) algorithm (see U.S. Provisional Patent Application No. 63/028,203) for 100% provably secure, uniquely keyed data security. All any digital developer needs to do is perform two simple steps:

1. Install either QwyitChip™ or QwyitSDK™ into your device, product, application
2. Place one single programming instruction: Get a Key, Call QC™.

And since we understand the ever-evolving multidimensional network, we have developed and are introducing a new trust model and method for the input into that simple instruction: Get a Key.

QwyitChip™ and QwyitSDK™ solve the Universal problem: they fit everywhere and anywhere on any network.

Now there's QwyitKey™ for universal operation: every implementation can generate their own anonymous keys.

The entire package solves both the universal and end-to-end security problems: a universal hardware and software method that Fits Anywhere, Works Everywhere.

DETAILED DESCRIPTION

QwyitKey™

Figure 1:
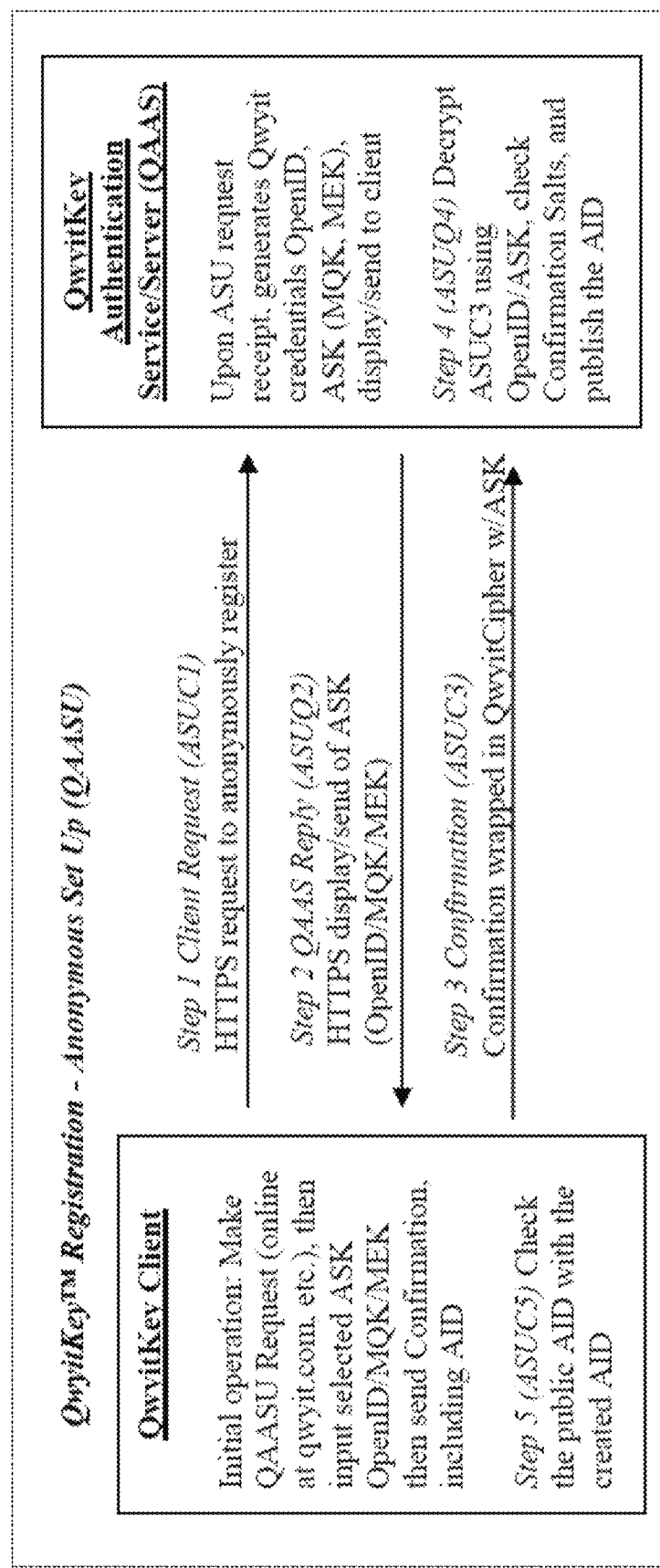
FIG. 1 depicts an exemplary embodiment of an anonymous setup operation according to one aspect of the present invention.

The Qwyit™ protocol (see U.S. Provisional Patent Application No. 63/028,203) provides authentication (embedded) and data security (stream cipher) for communications traffic based on a secret-key system. Qwyit™ is available now in its base implementation with the one-call QwyitChip™ and QwyitSDK™: wherever they are installed, the controlling software application needs to perform only one key management task: Get A Key—then call the QwyitCipher™ method residing in totality, identically, on those two products, with that key and the message. It will be sent to the application designated recipient 100% provably encrypted (data secured).

The authentication is entirely dependent on the provided key: what is its purpose and what trust model created, managed and delivered it? The key is either a system level authentication token or simply a per-message encryption key. The key's origins and management—and therefore its authentication value/metric—can be of any type; including, but not limited to the following.

First, one type could employ current PKI protocols (e.g., TLS) where the authentication is handled by PKI and the encryption is the QwyitCipher™ (instead of AES).

A second type could employ a third party key management system (see U.S. patent application Ser. No. 16/035, 123) which replaces PKI and TLS, providing mutual, constant authentication and encryption.

A third type could use self-managed systems, uniquely designed and created using any aspect of the Qwyit™ protocol as set forth in (see U.S. Provisional Patent Application No. 63/028,203), in which each system defines its authentication and data encryption metrics. Unique designs can certainly use other protocols as well.

A fourth type employs the present invention, called QwyitKey™, which is an authentication service for applications needing a simple, fast, self-managed, independent-trust key distribution service for authentication and encryption.

To be Authentic, there's got to be Trust. Both PKI and QwyitTalk™ follow the 'traditional trusted 3rd party' concept: They provide authentication through a registration process, and extend it into the messaging architecture. The registrations include some form of participant identification and the extended trust of the registration is accomplished by mathematics (in PKI this is theoretically sound; in Qwyit-Talk™, it is provably sound.) The authentication is then used to share an on-the-fly unique encryption key for data security (in PKI, this is a less-than-perfect encryption algorithm;

in QwyitTalk™ and QCy are the only provably secure perfect encryption algorithms.

While we noted in the Introduction that those PKI systems will never meet the universal security need, their existing implementations can be used to deliver encryption keys to our QCipher™ products. Also, while QwyitTalk™ is available as a drop-in replacement for those PKI systems, it can provide both authentication and QCipher™ encryption keys. But both of these require an identified registration (a certificate purchase in PKI; in QwyitTalk™, a Verified Setup)—and that's a great part of the multidimensional network's end-to-end security problem: they don't work like that. They work like this:

"Hey Alexa, text my mom." I am sending an authentic message, through Alexa, which is connected to my wireless network. Which will send a message to Amazon, to my Mom's Alexa device—or after checking that there isn't one, to her phone service's texting protocol/server . . . finally to her device. All of those 'places' should be able to authenticate and secure the message as they each individually need, and as the controlling applications dictate.

There are a great many unsolved problems with the 'end-to-end' security on these networks, dependent on the sender and/or the destination:
  Some of the networks want to know who sent the message—because they don't perform their own authentication/security, so they think they need to know!
  Some of the networks want to 'add' to the existing bloated bandwidth of the already authenticated/encrypted message—and they can only do that with current methods, making the traffic so large, it falls over
  Some of the networks use 'other' security methods, becoming incompatible with the message
  As these network connections change/update/multiply, so do these problem types Since it is impossible to 'solve' these individually (which is attempted, but obviously fails miserably whenever there's any future 'change', if the solutions work at all from the start), what's needed is a simple, universal method to Get a Key, Call QC™—for any traffic, anywhere, such that all individual network's authentications/encryptions are self-managed, and independently trusted everywhere.

Figure 5:
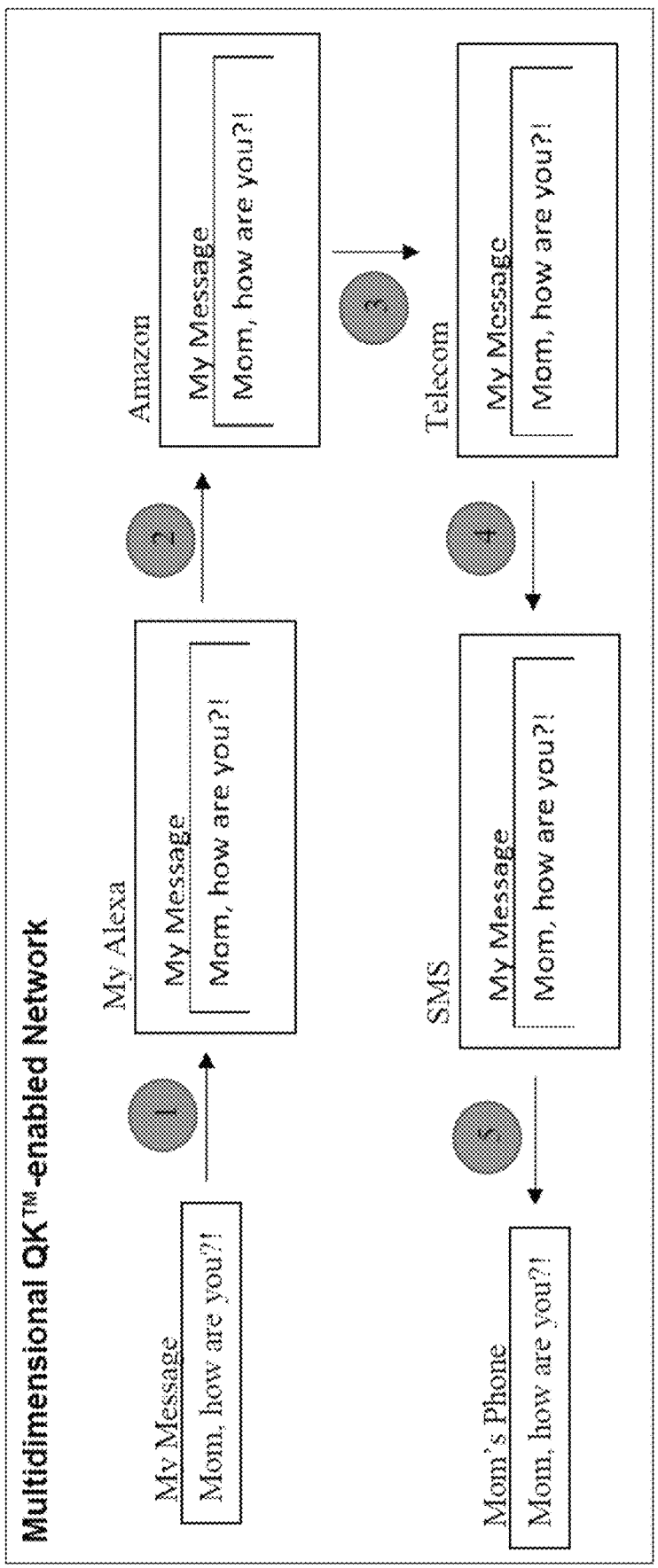
FIG. 5 depicts a multidimensional network enabled with the present invention.

It makes no difference what traffic is processing, each multidimensional 'place' can self-manage, passing it 'down the line' authenticating, encrypting/decrypting, such that the message is trusted from start to finish. Referring to FIG. 5, for example:

1. I create a message by texting my Alexa from my phone (I'm lazy . . . in bed, and Alexa is downstairs!). This message would be QwyitKey™ authentic/encrypted by the Alexa-app on my phone. It's sent to My Alexa—where it is QwyitKey™ bundled in total by the Alexa control app to send it to Amazon (as the owner/servicer of all things Alexa).

2. My Alexa sends it to Amazon, which knows my device, and can decrypt it back to My Message (still QwyitKey™ secured). Amazon's control devices can QwyitKey™ authorize/encrypt the message all over their network, ending on a communications switch, sending to the appropriate Telecom to get to my Mom. As part of the Alexa control app (either the version on my phone or the Alexa box, or both)—they 'know my mom' as one of my contacts—they know the destination number and can manage how to 'get to the right Telecom' 'place' that will deliver the message.

3. Prior to, or at, switch delivery, the Amazon QwyitKey™ wrap is decrypted (having assured its network of an authentic, secured message, from start to finish); then it is QwyitKey™ authenticated and secured by the switch to enter that network 4. The devices in the telecom network can QwyitKey™ authorize/encrypt throughout their network, maintaining 100% provable security, wrapping the secure message into their own QwyitKey™ authorized/secured encrypted-SMS message.

5. The final QwyitKey™ authorization/encryption occurs in the sending device out to Mom's phone where the sending device removes the last of their networks QwyitKey™ bundle. Then, on Mom's phone, there is a controlling app (any destination texting application that is QwyitKey™-enabled) that can finally QwyitKey™ authorize and decrypt the text message as coming from Me—using the original QwyitKey™ credentials that only her and I share.

OR

My original encrypted message is trusted all the way from end-to-end, simply passed along in its original state. In some networks, this is not only possible, but preferred. The entire purpose of QwyitKey™ authentication is its flexibility in meeting whatever network requirements exist.

Quite obviously, this can't be done using PKI certificates (otherwise it already would be). And while it is more than possible to implement QwyitTalk™ to accomplish this—real-world dynamics make it difficult to manage the identity of the components. The network is routinely changing, both from a traffic and management aspect, as well as physical network devices and components. It is this real-world dynamics that defines 'end-to-end'; and there are some crucially important features of the security that must exist when dynamically applied.

The four required features for any universal security protocol are: (i) Anonymity; (ii) Speed; (iii) Ease of Use; and (v) Secure.

Anonymity

Any universal security protocol must be anonymous. The devices and management won't be, but the security has to be, otherwise it will completely and instantly overwhelm itself: the extra layer of 'identity' for security purposes is not feasible—establishing it to get 'keys', maintaining it to use those keys, and re-configuring it to update/change those keys, etc. On top of network configuration and management of the devices themselves, another identity layer demands too much of the installation, maintenance, programming and user bases. This is evidenced by all the crime, incompetence, mismanagement, user confusion and continued failure of applying security to multidimensional networks.

This does NOT mean inauthentic. Network management is performed by many different controlling applications. It is the intention of Qwyit's QCipher™ product line to streamline, standardize and simplify performing authentication and encryption by providing a universal capability that can be put everywhere—and it is our QwyitKey™ authentication service that allows those controlling applications to manage the authentication aspect of device security in one simple programming call: Get a Key, Call QC™. Those device controlling applications already have and utilize inter-network connectivity methods; that is where QwyitKey™ will be called. Which is why the security identity can be anonymous for network implementation and QwyitKey™ service membership, while it is not anonymous within QwyitKey™ key sharing requests and network membership (the participants sharing the same QwyitKey™ keys know each other), and therefore authentic.

The methodology for how to manage network device membership would then be the most vulnerable security juncture. Since any device can anonymously join the QwyitKey™ service; it is a simple thing to then insert a somehow-fraudulent device (a repeater, a replacement, etc.) into the network if the device membership methods and controls (the software, etc.) are insufficient, inadequate— somehow easily compromised.

The QwyitKey™ authentication service will provide 100% provable assurance that the requesting OpenID is the one contacting you. You (or your device) will then have some other means to assure yourself that that OpenID is being used/controlled by the anticipated Sender (or their device). This is the definition of Independent Trust: the authentication of the communication is assured by the QwyitKey™ Service, the communication ownership/authentication is assured within the context of that particular communication, network, etc. (which may be a part, or the whole). This is the job of the controlling application. In multidimensional networks, hardware management controlling software will perform the job of assuring messaging context/pathways (which devices, switches, apps, etc.); while QwyitKey™ assures each called Authentication Request.

For example, by pre-shared device lists (such as in a single car's IoT control software for all its sensors), by P2P established relationships (the car to the manufacturer), or other financial, interdependent relationships (autonomous driving capability to a car-loaner service.), etc.

Independent Trust is the only trust model that allows both existing and new networks the ability to 'bolt-on' or 'design-in' competent, understandable security. Existing networks now have a simple process for implementing meaningful, useful and properly functioning security: Wherever our traffic goes, put a QCipher™ into the architecture (hardware or software), and add the one-command Get a Key, Call QC™ to the controlling apps—then we'll have trusted end-to-end security while we handle it, regardless of its state when we get it and finish with it.

New networks, presently completely bewildered and overwhelmed with using/managing/integrating current security methods (so security is either left out, poorly integrated, or unusably fiendishly 'expert-driven'), have the same simple design step as existing network proliferation: Wherever our traffic goes, put a QCipher™ into the architecture (hardware or software), and add the one-command Get a Key, Call QC™ to the controlling apps—then we'll have trusted end-to-end security while we handle it, regardless of its state when we get it and finish with it Speed The second feature of any universal security is that it must be fast. Performing multiple layers of authentications and encryptions must be done at transmission or line speed, i.e., the speed it takes the data to propagate through the network or hardware even if it is not encrypted. Qwyit's patented techniques deliver this.

Easy to Use

The third feature of any universal security is that it must be easy to implement. Requiring developers to master hundreds of pages of implementation details ensures lack of use. Simply put, any universal security must be simple and easy to use. For example, one should simply get a key on-the-fly, and then use it. QwyitKey™'s one-step authentication request guarantees this.

Secure

The last feature of any universal security must be that it is secure from attack. Qwyit's fundamentally unsolvable underdetermined mathematics proves this.

QwyitKey™ Anonymous Authentication Service

QwyitKey™ Anonymous Authentication Service (QAAS) is the world's first participant-managed, independent-trust secure messaging capability. QAAS is an implementation capability that utilizes the encryption protocols described in U.S. Provisional Patent Application No. 63/028,203 (termed herein as "QCy"). Introduction The various authentication and encryption protocols set forth in the aforementioned patents by the inventor may be used herein. The QCy protocol provides authentication (embedded) and data security (stream cipher) for communications traffic based on a secret-key system. Any of these authentication and encryption protocols can operate when the application/device provides a meaningful system key. The key is either a system level authentication token or simply a per-message encryption key. The key's origins and management can be of any type; including, but not limited to: (i) Current PKI protocols (e.g., TLS) where the authentication is handled by PKI and the encryption is our QCy instead of AES; (ii) the third party key management system which replaces PKI and TLS, providing authentication and encryption as set forth in U.S. patent application Ser. No. 16/035,123; (iii) self-managed systems, uniquely designed and created using any aspect of the encryption and authentication protocols, such as QCy or others in the aforementioned patents; or (iv) the QAAS Authentication Service, for applications needing a simple, fast, self-managed, independent-trust key distribution service for authentication and encryption. In particular, QAAS works extremely well with the QCy embedded in a chip, called QwyitChip™ hardware and an identical software version, called QwyitSDK™ which is also based on the QCy protocol.

Approach

The QAAS Anonymous Authentication Service provides a method to allow any network application to authenticate and encrypt all messages between its participants. Please see the U.S. patent application Ser. No. 16/035,123 for a complete explanation of the rationale for this system. QAAS requires a single round-trip anonymous registration (Anonymous Set Up (ASU)), then minimally initial-only authentication requests (AR) for any participant's communication Receiver list. After that, participant-to-participant authentic, provably secure messaging can be performed for the lifetime of participant network membership.

For networks to use the QAASAnonymous Authentication Service, their applications will ask the user to anonymously join QAAS Server by performing a simple, 1-click join command operation embedded in the app. QAAS membership keys (called Authentication Service Keys (ASK) are stored and managed by the network application as opposed to a central server. The ASK should be participant PIN-protected by the network application, as outlined in the following CKS section. For any network message destination (receiving participant) to whom/where the user has not initially communicated, a 1-click single round-trip Authentication Request (AR) is performed.

This is a simple, invulnerable way for network participants to remain anonymous for channel authentication during key creation and exchange, while they are known to each other (and uniquely authenticated) by the controlling application. The trusted third party (the central server, called QAAS server or QwyitKey™, has no network membership nor participant knowledge, and is only used to assure key distribution between the correct two messaging parties. The trust is only that the messaging pair are provably authenticated to have established their key exchange with each other's device, setting up their own VPN tunnel in accordance with the present invention. Within the content of this secure context, and the controlling application performing this exchange, they will authenticate themselves as the expected participant end users.

The summarized process includes: the sending participant self-generates a QAAS Session Start Key (SSK in two parts, SQK/SEK), specifically for communication with this intended Receiver. The Sender then submits a secure Authentication Request to the QAAS Server using their ASK that includes the Receiver OpenID and only ½ of the key, the SEK. Whereupon the QAAS server replies to the Sender in their ASK by including a receiver-only readable Authentication Bundle (AB), containing the SEK, in the Receiver's ASK. The sending participant then communicates provably securely with their intended Receiver participant with the first message including the AB; which when confirmed by the Receiver, creates their lifetime unique SSK (unless updated through another QwyitKey™ Authentication Request).

The QAAS Anonymous Authentication Service eliminates third party key management complexity by actually mirroring how network traffic works—independent user and messaging authentication and security. The QAAS Anonymous Authentication Service eliminates network software application complexity, reducing security development and programming to two simple, universal steps (Anonymous Set Up, Authentication Request). The QAAS Anonymous Authentication Service takes full advantage of 'Anywhere/ Everywhere Security' using the QCy protocol, specifically offering a simple proliferation strategy for implementations of the QwyitChip™ hardware product, and the identical software QwyitSDK™. The QAAS Anonymous Authentication Service solves the 'end-to-end security problem' by offering a simple, universal authentication and encryption method.

QwyitKey™ Components

The following are required for the QAAS Anonymous Authentication Service of the present invention. First, a central server is required that is connected to a network or the Internet via which network participants can submit requests. The QAAS Anonymous Authentication Server can be hosted privately or publicly operated. A QAAS-compatible client application is required to perform the functions set forth herein.

QwyitKey™ Core Required Processes

There are two core processes required by the QAAS service. First there is a setup and then an authentication request.

One-Time Anonymous Registration (QAASU)

An initial QAAS client anonymous authentication token distribution is accomplished through a QwyitKey™ Authentication Anonymous Setup (QAASU) with the QwyitKey™ Anonymous Authentication Server (QAAS). Token (ASK) is a 512-bit 2-part key, with a public identifier: an OpenID (up to 64-bits), MQK (Master Qwyit Key, 256-bits), MEK (Master Exchange Key, 256-bits). These bit lengths are selected for a 256 bit message key implementation. Other sizes could be employed for the key size, which would modify these values accordingly.

This setup is to establish participation in any network wanting to establish simple participant messaging authentication and security. This is not user/client registration, as in QwyitTalk™ or a PKI Certificate Authority. The QAAS service authenticates the message. The participant is authenticated within the network context and content.

FIG. 1 depicts the anonymous setup step of the QAAS service. The Client makes a QAASU Request (e.g., online at qwyit.com, etc.). Upon ASU request receipt, the server generates QAAS credentials, which includes: an OpenID, and an ASK, which has two parts, an MQK and an MEK. These credentials could be generated before the request and then simply displayed or sent to the requesting client. Once the requesting client has received the credentials, the requesting client sends a confirmation message as described below back to the server to ensure satisfactory receipt and implementation of the credentials.

Referring to FIG. 1, steps 1 and 2 use current secure messaging (e.g., HTTPS, email, etc.), and are reliant on that security. Should it be deemed insufficient, there are other key distribution methods, methods, including QwyitTalk™ initial key distribution and those listed as Optional Processes later in this document. The QAAS client and server may use the TCP/UDP IANA reserved port for HTTPX, port number 4180 in a web architecture.

The format of any sent messages is shown in brackets following each step description. The format follows this syntax: [MessageTitleID: parameter1, parameter2, . . . ended with a QAAS termination character (^)].

Each participant pair (QAAS Server/Client, Client/Client) may perform a PDAF to create new keys at session end (either MQK, MEK after an ASU, or updating SQK, SEK after an AR), at the designated interval, etc.; which can be static, or known-random (i.e., from a selection of the uniquely embedded key content—this would be client-app configured.).

QwyitKey™ Anonymous Setup (ASU)

Client initiates ASU within the app/online (as required/ desired) with the Authentication Service/Server (Step 1, ASUC1). Go to www.Qwyit.com/QwyitKey where an HTTPS session will begin. Select the 'QwyitKey Registration' link and/or button.

QwyitKey Anonymous Authentication Service/Server (QAAS) replies to client (Step 2- ASUQ2). QAAS server generates (possibly multiple) unique OpenID/Authentication Service Key (ASK) pairs and displays/sends to the registering anonymous client (ASUQ2). The MQK, MEK keys are each currently recommended to be 256-bits (64 hex digits). There are multiple ways to perform this step, including manufacturer pre-stamping an ASK into a device; the only requirement being that the QAAS is aware of the available ASKs that will be used.

The requesting Client selects OpenID/ASK, and enters (any method) into their application/device. The Client then sends an encrypted Confirmation Message back to the QAAS initiating the (selected/received) ASK (Step 3, ASUC3). The Client will enter the selected OpenID, ASK (possibly displayed in two sections, MQK, MEK) into their app/device, (recommended PIN-protected). The client will insert into use (store ASK, OpenID in cookie, file, or database). The Client sends Reply (ASUC3) to QAAS with Confirmation Message. The client creates a 16-hex digit (64-bit) Authentication ID (AID); this number is public and will be published.

As it is not a requirement for any QwyitKey™ client to be able to create RNG/PRNG bits, if a client cannot do so in any system-authorized manner, the present invention can be used to generate new random values using the PDAF function with static pre-stored bits. There are any number of methods for 'endless' (at least as many key creations required during the device/app lifespan); using small stored 'selector' bits, and system-sized (512-bits currently) stored 'key' bits in multiple PDAF random rearrangements/selections.

The client creates the Confirmation Salt (CS), which is a 128-bit, 32 hex digit ID salt created by using the last 32 digits (128-bits) of the MQK in a PDAF with the first 32 digits (128-bits) of the MEK. The client performs a PDAF (MQK last 128-bits, MEK first 128-bits), the result of which is the Confirmation Salt. The client then performs the QCY encrypt using the W created from the ASK on the CS, and the result is CS encrypted (CSe). The client then sends the confirmation message (ASUC3) output (OpenID, OR, AID, CSe) to QAAS. The message format for the ASUC3 is: [ASUC3: OpenID, OR, AID, CSe].

The server then decrypts the confirmation message as follows (QAAS decrypt of confirmation message (Step 4, ASUQ4)). The server performs the QCY decrypt using the ASK (which the server knows by the OpenID received in the confirmation message, which was associated by the server initially when created with the OpenID) and reveals the message key (W). The QAAS server will hold ASKs for a specified period of time for client apps to reply, and activate their ASKs. If the time has passed, the server may not maintain these ASKs/OpenID pairs. The server uses the message to decrypt Confirmation Message by creating the correct same CS and comparing the one the server creates with the one decrypted in the confirmation message. The server perform a PDAF (MQK last 128-bits, MEK first 128-bits), the result of which is the Confirmation Salt generated (CSg). The server perform decrypt using W and CSe, result is CS received decrypted (CSd). The server compares the CSd received decrypted with the CS generated. If there is not a match, an error is sent. Since the registration is anonymous, the error needs only to be 'Terminated'. Of course, the server could be programmed to ignore mismatches if determined to be mischievous. If match is confirmed, the server stores the OpenID, ASK, AID into QAAS Authentication database. The server then publishes the AID for public inspection, associated with the OpenID.

At this point, the setup is complete, but preferably the Client should check the published AID (see FIG. 1, Step 5, ASUC5). The Client should check that the QAAS published AID is the same as the generated one, and the sent version. This is because the AID is not encrypted—a quick look by the Client is recommended. If there is a discrepancy, either perform another ASU, or use the QAAS 'contact us' system to report a problem.

One-Time (Minimally), Initial Receiver Authentication Request (AR)

Figure 2:
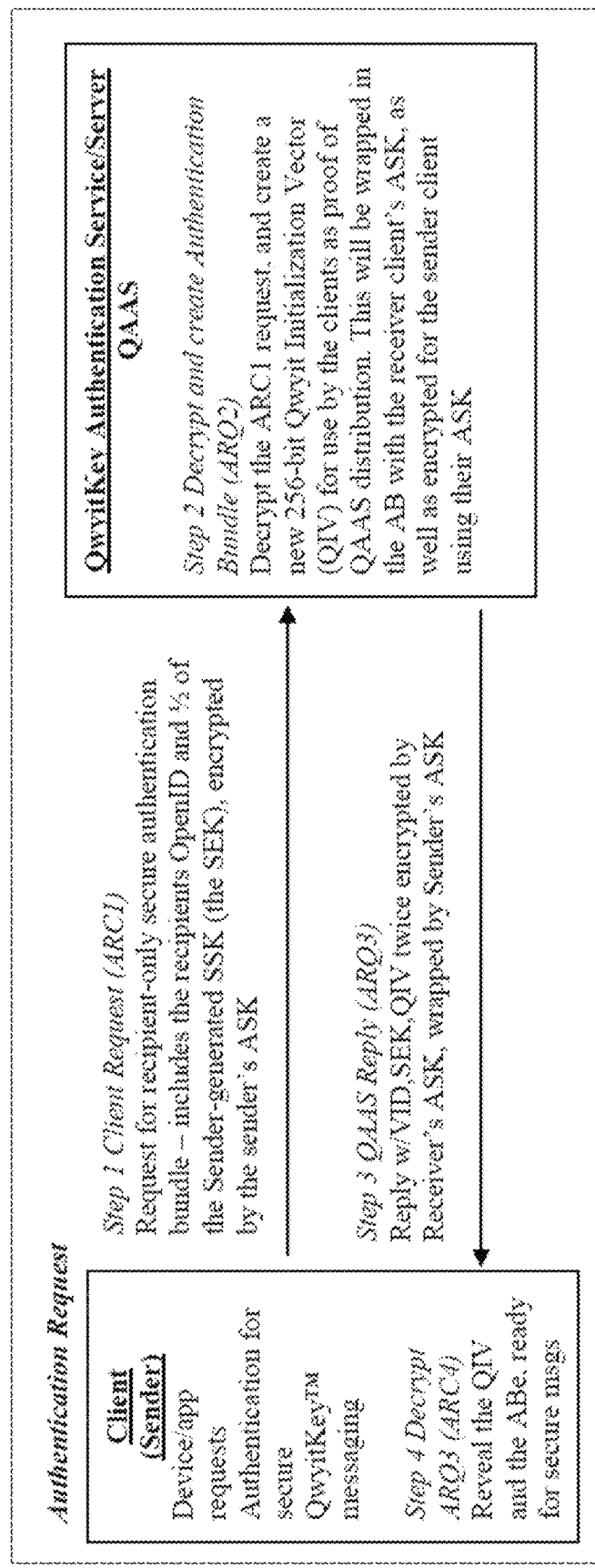
FIG. 2 depicts an exemplary embodiment of an authentication request operation according to another aspect of the present invention.

Turning to FIG. 2, the following is for a P2P architecture, with 1-1 communication, but the same techniques can be applied to group key scenarios.

For each intended messaging Receiver, the sender will initiate a private real-time Authentication Request (AR) with their shared QwyitKey™ Anonymous Authentication Server in order to create a QwyitCipher™ VPN tunnel with the intended receiver (based on their OpenID). The AR will exchange a token that is a 256-bit Session Exchange Key (SEK). This is one half of the Sender-generated Session Start Key (SSK) pair in 2-parts: SQK [Session QT™ Key, 64 hex digits, 256-bits], SEK [Session Exchange Key, 64 hex digits, 256-bits])

This is a simple, invulnerable way for network participants to remain anonymous for channel authentication during key creation and exchange, while they are known to each other (and uniquely authenticated) by the controlling communication application.

The trusted third party has no network membership nor participant knowledge, and is only used to assure key distribution between the correct two messaging parties.

The trust is only that the messaging pair are provably authenticated to have established their key exchange with each other's device, setting up their own QwyitCipher™ VPN tunnel. Within the content of this secure context, and the controlling application performing this exchange, they will authenticate themselves as the expected participant end users.

The AR SEK is unique to each messaging pair of participants. The QAAS simply decrypts AR requests and sends AR replies, never storing any SEKs. Should there be a requirement to retain SEKs, the QAAS will need to be set to do so. Since the participants are anonymous, if the requirement arises to understand private conversations, after requiring the QAAS to store SEKs, the entire message stream from the very beginning to/from the anonymous participants would need to be captured in order to be read.

Authentication Request (AR)

Client Sender sends Authorization Request to the QwyitKey™ Authentication Service/Server (Step 1, ARC1). In this step, the client sender sends Authorization Request (ARC1) to AS in order to receive the intended Receiver's Authentication Bundle. The client randomly generates a Session Start Key (SSK) for the intended Receiver (128 hex digits, 512-bits) in two parts, SQK, SEK. The client sends ARC1 to the server: SenderOpenID, OR1, CT1 where CT1 is encrypted in QCy using the client's ASK. OR1 is a new open return generated in accordance with the QCy protocol. The message format is: [ARC1: SenderOpenID, OR1, CT1] where CT1 is the encrypted ReceiverOpenID, SEK.

The server QAAS decrypts the authentication request, i.e., ARC1 (Step 2, ARQ2). The server decrypts ARC1 from the Client using the received SenderOpenID, OR1, ASK in QCy revealing the ReceiverOpenID and SEK. The server checks that Receiver client exists.

If the Receiver Client does not exist in QAAS, certain steps can be taken. If this QAAS is part of a federated group, the server checks with other QAAS members as per the QwyitKey™ communication key exchange framework of the group. The server notifies the Sending Client of situation, if desired/required that there is no Receiver client.

The server sends a reply to the Client (see FIG. 2, Step 3, ARQ3). In this step, the server creates a new random 256-bit Qwyit Initialization Vector (QIV) for this messaging pair. The server creates an Authentication Bundle (AB) for the Receiver Client using the Receiver Client's ASK, and the server creates another Open Return (AB-OR) for the AB. The server uses the AB-OR in a QCy encrypted message to encrypt the AB (eAB). The AB is the Sender Client's AID, the SEK and the new QIV, i.e., eAB=eAID, eSEK, eQIV. The ARQ3 is returned to the sending Client. The ARQ3 includes the Receiver client's AB-OR, ABe in a QCy message encrypted using the Sender's ASK with another OR, OR2. The message format is [ARQ3: OpenID, OR2, CT2] where OpenID is the Sender Client's OpenID, OR2 is newly generated, and CT2 is [QIV, AB-OR, eAB] encrypted using the Sender's ASK.

While the Sender knows the PT and can derive the Msg keys used to encrypt the AB, but knowing any message key does NOT provide any information or ability to derive the recipient's QwyitKey ASK.

Sender Client then decrypts ARQ3 (see FIG. 2, Step 4, ARC4). Sender Client decrypts ARQ3 from QAAS using their ASK and OR2 in QCy. This decryption reveals the QIV, the AB-OR and the Authentication Bundle, still encrypted by the Receiver's ASK. The sender is now prepared to authenticate and share their self-generated key with the Receiver. Sender and Receiver Clients commence communicating, e.g., Messaging, with Sender initiating contact with a QAStart message (including AB-OR, eAB for Receiver to authenticate the sender by the AID and QIV, and to derive/share the full SSK (including the missing SQK). QAAS and Sender Client perform a PDAF PFS No communication ASK key update. Perform a PDAF (MQK 256-bits, MEK 256-bits) for two rounds, creating 512-bit result w/MQK, MEK halves. Optionally, extend the above PDAF for 2 rounds (doubling length) and perform an OWC. Keeping the keys in synchronization between the QAAS server and each Client needs careful attention. Each different QwyitKey™ network may require unique handling.

QwyitKey™ Messaging

Figure 3:
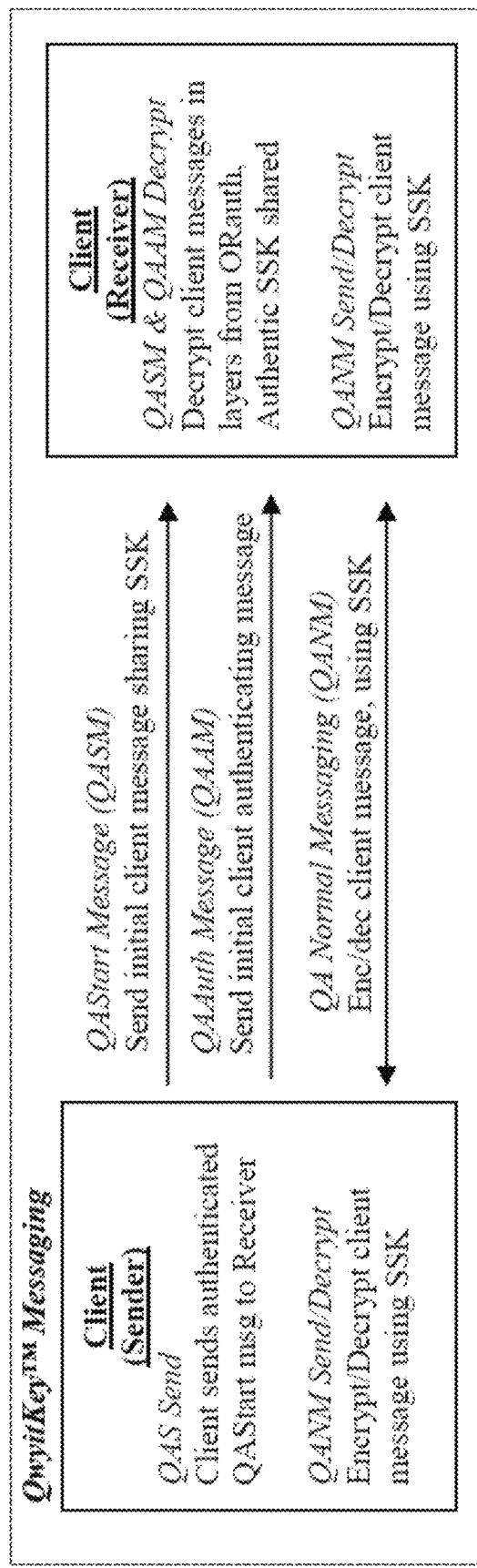
FIG. 3 depicts an exemplary embodiment of a messaging operation according to yet another aspect of the present invention.

Turning to FIG. 3, QwyitKey™ Messaging occurs between each pair participant using their own generated SSKs in secure QwyitCipher™ exchanges. The SSK (SQK, SEK) must be handled and stored securely; handled by the controlling application.

QwyitKey™ Messaging

Sending Client sends QwyitKey™ Authentication Start Message to Client Receiver (QASM). The Sending Client sends the QASM message to the intended Recipient Client for whom this SSK was created. The Start Message shares the QAAS eAB demonstrating an authentic QwyitKey™ client contact. The first half of the shared SSK, the SEK, is exchanged and now shared. The format of the message is [QASM: SenderOpenID, AID, AB-OR, eAB].

Sending Client also then sends QwyitKey™ Authentication Authentication Message to Client Receiver (QAAM). Using the AR self-generated SSK created for this Receiver, the Sending Client performs a MOD16 (SQK,QIV), the result of which is ORauth (ORa).

The Sending Client create new message content (IMSG, the Initial Message opening communication). The Sending Client performs QwyitCipher™ on IMSG with the new ORa and self-generated, SQK/SEK, the result is eIMSG. The Sending Client sends the QAAM Authentication message to the intended Recipient Client. The message format is [QAS: SenderOpenID, ORa, eIMSG].

It's certainly possible to send the Start and Auth messages as a single message—but the two encrypted packages can be difficult to separate even though the eAB is a static length. If they are combined, it is called the QwyitKey™ Opening Message (QAOM) formed as QAOM: SenderOpenID, AID, ORa, AB-OR, eAB, eIMSG]. The QwyitKey™ key distribution system only authenticates that the contacting client is a QAAS member, and that the messages being received are from the public AID associated with the SenderOpenID. Authentication of the actual owner (whatever/whoever that might be in any particular network system) is within the context of the message content. This is accomplished within the application/network and the IMSG content/meaning using QwyitKey™.

The Receiving Client decrypts QASM and QAAM (QASM/QAAM Decrypt). Optionally, the Receiving Client also decrypts the QAOM singular message. The Receiver Client decrypts in layers. First, the QASM is decrypted using the ASK and AB-OR to decrypt the eAuthentication Bundle sent from the QAAS, revealing the AID, SEK for this Sending Client, and the QIV. Then, QAAM 1st decryption occurs. The Receiver Client performs a MOD16D (ORa, QIV) to reveal the SQK for this Sending Client. The full SSK is now known, having been securely distributed through the QAAS, without the QAAS having knowledge of the keys. The QAAM 2nd decryption occurs using the ORa, and the new SSK to decrypt eIMSG, revealing the content, which contains authenticating information to verify the Sending Client's identity and/or information. The Receiver Client performs the Authentication Check, comparing AID sent from the QAAS to the one sent from the Sender, and both to the public version. If they all match, then clients now have a shared, unique, private SSK—which can be as long-lived as deemed appropriate for the application network; updated as required/advised. The Receiver Client then operates on the IMSG content and continue QwyitKey™ Messaging (sending QANMs) using the shared SSK in QwyitCipher™ provably secured messages. If they don't match, an errro message is sent to the Sending Client.

At known intervals, or system defined end of SSK key life reached (# of messages, time, etc.), both Clients perform a PDAF PFS no communication key update to create new Session keys, called Client Master Keys (CMK). This is done by performing a PDAF(SQK 256-bits, SEK 256-bits) for two rounds, creating 512-bit CMK result with CQK, CEK halves. Optionally, extend the above PDAF for 2 rounds (doubling length) and perform an one-way cut function (OWC).

Client Application Key Storage (CKS)

Turn on Pin-protected Client Key Storage (CKS). To tie the local version of the QwyitKey Anonymous Setup ASK to the individual user, as opposed to just the device (or for a simple, effective encrypted storage technique in addition to the many already available to the client application through the OS, etc.), it is recommended that an n-digit hex PIN be used to encrypt ASK local storage with simple MOD16 addition. The desired security indicates the number of digits, and the PIN must never be stored anywhere on the device. This local protection maybe also be accompanied by limiting the number of incorrect attempts locally, after notification from the QAAS of incorrect key use (online, in HTTPS).

Anonymous Registration Options (QwyitKey ASU)

Pre-Shared

Chip developers or software manufacturers can provide QwyitKey™ lists of OpenID/QK Keys (in two 256-bit parts, MEK/MQK). In this case, the User's device software would begin network participation by sending the QASUC3 Confirmation message, including the self-generated AID. Only one key (MEK) could be on the device controlling software; or just an n-bit value. These are then PDAF mixed with an openly sent value from QwyitKey™ to create the starting keys. Any combination of pre-shared values/keys in any combination of trusted pre-sharing mechanisms are possible (additional transmission capability dependent). Security is based on secure submission from/to the manufacturer and QwyitKey™. Other Pre-Shared methods are possible, such as the Device self-generates their own OpenID/ASK and submits them to the QwyitKey™ using some channel. Channel examples such as phone, email, snail mail could include an smaller-than-ASK-sized offset, since copying/submitting 512-bit ASKs could be error-prone. TLS-based web submission can include cutting/pasting from the generating App into a QwyitKey™ submission web page. Security is based on the submission type (TLS, snail mail, phone, email, etc.). This requires an additional round-trip Accepted/Denied QwyitKey™ Reply message to the Confirmation Message that first, the OpenID is unique and second, to test that the keys are correctly understood (since this is an anonymous submission). The QwyitKey™ would perform a PDAF(MEK/MQK) and send the 256-bit result, encrypted by the shared ASK, to the Participant to check. If the Participant's result of their PDAF doesn't match, an ASU Cancel message would be sent to the QwyitKey™ to remove the OpenID/ASK pairing, and the Participant would try again.

Figure 4:
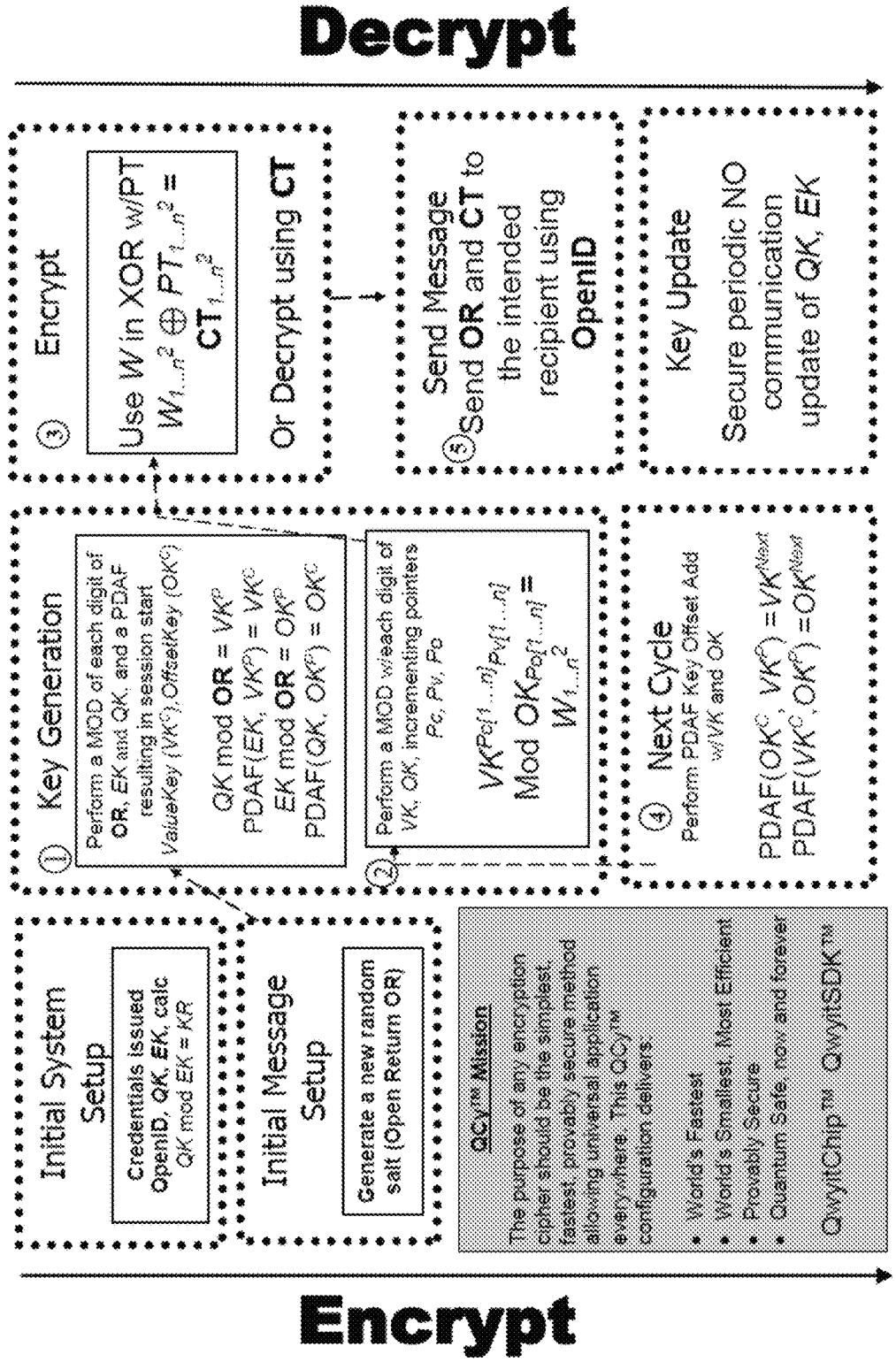
FIG. 4 depicts an exemplary embodiment of a stream cipher according to still another aspect of the present invention.

FIG. 4 shows the QCY Stream Cipher and Key Exchange/Update. The initial system setup requires issuance of three credentials—all random numbers—an OpenID, and two keys (QK, EK). Additionally, a random salt is generated called the Open Return (OR).

Key Generation comprises four calculations to create two pointers ($VK^P$, $OK^P$) and two offset keys ($VK^C$, $OK^C$) as follows:

$$VK^P = QK \text{ MOD } OR$$

$$OK^P = EK \text{ MOD } OR$$

$$VK^C = PDAF(EK, VK^P)$$

$$OK^C = PDAF(QK, OK^P).$$

Once the pointers and offset keys are determined, the message key can be created as follows:

$$W_1 \ldots n^2 = VK_{Pv[1 \ldots n]}^{Pc[1 \ldots n]} \text{ MOD } OK_{P0[1 \ldots n]}$$

QCy Overview

The Qwyit® Authentication and Data Security protocol includes a unique and property-filled function called the Position Digit Algebra Function (PDAF). The PDAF of the present invention uses two inputs, X and Y. The output Z is determined by modular summing two inputs of X where one of the inputs of X is determined by the value of Y. For example, let:

$$X_n = x_1 x_2 x_3 \ldots x_n$$

$$Y_n = y_1 y_2 y_3 \ldots y_n$$

$$Z_n = z_1 z_2 z_3 \ldots z_n$$

Then, $z_1 = x_1 + x_i$ where $x_i = f(y_i)$. In one embodiment, the value of $y_i$ determines the value of $x_i$ by counting the number digits from $x_i$ until reaching the $i^{th}$ digit from $x_1$ where $i = y_1 + 1$, such that if $y_1 = 0$, then $x_i = x_1$ and if $y_1 = 1$, then $x_i = x_2$ and so on. Essentially, the value of Y points into the input X to determine which two values of X are modular summed to create each value of Z.

To use the function as a simple, one-step underdetermined cipher, the PDAF becomes the QCy function by minimally adding to it to include performing the one-step simple XOR of the PDAF result with the TargetText, either plaintext to be encrypted or ciphertext to be decrypted.

The process of the QCy requires, ideally, two input n-bit (e.g., 256 bits, but this could be any length preferably divisible by eight) key values (or one that will function as both keys—not recommended as this reduces the initial key space)—calling one the ValueKey (VK) and the other the OffsetKey (OK). An OpenReturn (OR), which is a same-bit-sized public Initialization Vector, is also included; as well as either the plaintext (PT) to be encrypted or the ciphertext (CT) to be decrypted. Both keys should be the same number of bits (digits)—although this is not required (the function can be written to accommodate short pointing keys that are concatenated to meet the return requirements, although this is not recommended).

Initialization Step:

The process begins by modular (MOD) adding the OR and the Authentication Key QK to create a unique starting ValueKey pointer $VK^P$. Then the process performs a PDAF function of that pointer $VK^P$ with the Authentication key EK.

This creates an underdetermined starting ValueKey that even if it were discovered or stolen will not leak the Master system Authentication Keys. The Master Authentication Keys should be stored/managed separately from the calculated encryption keys.

The process creates the starting OffsetKey in the same manner, by MOD16 adding the OR and the Authentication Key EK to create a unique starting OffsetKey pointer $OK_P$, then performs a PDAF function of that pointer $OK^P$ with the Authentication key QK. Because process of the present invention is designed to be one-step, extremely flexible for implementation everywhere, the key lengths can be any size. There are no block requirements, no restrictions on size. Recommendation is for an even number of bits for simplicity.

Step 1:

The process sets pointers at digit position 1 in each key (Po in the OK, and Pv in the VK). The process takes the value at Pv and MOD16 adds it to the digit in the Po position. E.g., if the VK is "19B3AD2" and the OK is "C0FF48C", the first PDAF result is 1+C=D where the 1 is from the Pv at position one, and the C is selected from the Po in the OK. These results in total form the Message Key, W. See FIG. 4 and the Selection Options section for additional ways to perform the PDAF on VK/OK. All of the methods produce underdetermined message keys.

Step 2:

Take the PDAF add result (W) and XOR it with the TargetText (PT or CT) first 'value'. E.g., if the TargetText is PT="This is a test!", the PDAF select add result of D is XOR'd with "T". The TargetText can be 'value' sliced any way, in 4- or 8-bit 'values', etc.; as long as the XOR of key bit and TargetText bit is performed uniquely and non-repetitively.

Move both pointers one position to the right. A complete cycle is from 1 . . . n digits in the VK and OK.

Repeat for More Data

If there is more TargetText remaining at the end of the cycle (denoted by pointer Pc), increment Pc by one, move the Pv pointer one digit position to the right of its last cycle start (e.g., the $2^{nd}$ cycle will start at digit position 2, $3^{rd}$ cycle at position 3, etc.), and perform another same select add/cipher XOR cycle where the Po always starts at the first OK position.

There will be Length (VK) squared cycles in total. E.g., a 256-bit key, containing 64 4-bit hex values, will have $64^2$ (4,096) returned PDAF_SEC 4-bit digit results. This is for each Selection Cycle Case noted below; using all three Selection Cycle Cases will yield $64^2 \times 3$ (12,288) returned PDAF_SEC 4-bit digit results.

The most optimal method for performing these calculations depends on the format of the data in the specific software language or hardware design markup language being used to keep the number of extra steps at a minimum. For example, Java uses 8-bits to describe a number, but one of the bits is a sign bit, whereas C does not use a sign bit. Additionally, multiple reads may be required to perform certain functions in software, whereas in hardware languages, such as Verilog or VHDL, the entire 256-bit value can be processed in a single step. Therefore, the optimal design must consider these factors when designing the actual implementation in a given language and environment.

Key Update

If there is more TargetText remaining at the end of all cycles (a complete cycle set), update the VK and OK, reset the Pv and Po to the $1^{st}$ position and continue as above until the end of the plaintext/ciphertext (at the end of each cycle set, continue updating/cycling until PT/CT is exhausted).

The update must reconfigure both the VK and OK such that there is a mathematic one-way gate 'across' the cycling resets. If it is possible to write a single, continuing equation where $VK^{New}$ and $OK^{New}$ are known extensions of $VK^{Start}$ and $OK^{Start}$, then any positively known (impossibly broken, but possibly known) Plaintext would result in the continued ability to derive W and realize the correct message content (the key values wouldn't necessarily be known if they are combined in some fashion, but their result would be).

In the protocol of the present invention, QCy™, the one-way gate is the Qwyit® PDAF function. It provides a one-way linear MOD16 across digit positions, by mixing/adding different positions of both keys pointing 'into' each other as dictated by the values in the keys. We will describe this in more detail later (function definition and two operating modes (Offset Key Add and Dual Key Add)).

In order to quickly reconfigure both keys, perform a PDAF using VK to point into OK to update VK and another PDAF using the OK to point into VK to update OK. This reconfiguration provides the Random Rearrangement property of maintaining a new, unique key bit for every plaintext bit.

Later we describe in more detail a complete Random Rearrangement definition and security explanation of this innovative cryptographic function.

Then continue the next cycle set with the reconfigured keys.

This Update Method, Random Rearrangement value mixing, creates a never-ending series of new keys that are distinctly unique, always maintaining their random entropy and that create the required endless, never-repeating child message keys for encryption. This property of Random Rearrangement delivers a true Ideal System.

FIG. 4 depicts an exemplary embodiment of the QCy Cipher. The QCy's process of underdetermined linear equations includes:

Qwyit® ID: OpenID [This is the public Qwyit® Community ID]

Qwyit® Keys: EK, QK [These are the upper level Qwyit® Authentication Keys]

Initialization Vector: OR [A randomly generated public Initialization Vector].

The Encryption/Decryption Session starts by determining the starting ValueKey and OffsetKey, which are determined from:

$$QK\ MOD16\ OR = VK^P\ then\ PDAF(EK, VK^P) = VK^C$$
[Starting ValueKey]

$$EK\ MOD16\ OR = OK^P\ then\ PDAF(QK, OK^P) = OK^C$$
[Starting OffsetKey].

While a MOD16 is shown, the actual base of the modular function is not limited to 16 but could be other values, depending on the implementation requirements.

The Selection process includes:

$$VK^{Pc[1\ldots n]}_{Pv[1\ldots n]} MOD16\ OK_{Po[1\ldots n]} = W_{1\ldots n^2}$$

Where pointer Pv and Po increment +1 through the key length for each cycle pointer Pc

[This is a PDAF in Dual Key ADD mode as described in FIG. 4.]

If repeating, substitute $VK^N$ and $OK^N$ for each new cycle

The Cipher process is as follows:

$$W_{1\ldots n^2} \oplus PT_{1\ldots n^2} = CT_{1\ldots n^2}\ \text{repeating w/next cycle selection if more PT}$$

The Update process is as follows (if more PT):

$$\text{Update ValueKey:} PDAF(OK^C, VK^P) = VK^{Next}$$

$$\text{Update OffsetKey:} PDAF(VK^C, OK^P) = OK^{Next}$$

Where the PDAF performed is the Key Offset Add mode

The Repeat Process for as long as there is data:

Cycle through Selection, Cipher, Updates, replacing VK and OK until PT, CT completed.

Finally, Send Process includes:

Per Message[OpenID, OR, CT] to the OpenID location of intended recipient.

QCy™ PDAF_SEC Selection Options

The Perfect Secrecy provided by the cipher of the present invention is detailed; the irrefutable mathematic foundation for this security is that cipher is underdetermined at every step. In that regard, there are additional options for the Selection step. This step provides the endless key values using a PDAF mode—either an Offset Key Add Mode or the Dual Key Add Mode. The default case shown above, uses the PDAF Dual Key Add Mode. Any of these can be used, in any combination, as they all remain underdetermined and provide unique results. The choice can be made based on performance, code space, code specific limitations, etc. These additional Selection Case methods are shown below.

| Case | General Equation* | Description |
|---|---|---|
| 1 | $VK^1$ mod $OK^1 = W^1$ | Default: DUAL KEY ADD MODE, ValueKey plus OffsetKey, starting at digit 1 of each and adding that position. Continue until all digits have been added to each other |
| 2 | $VK^1$ mod $VK^X = W^1$ | OFFSET KEY ADD MODE, ValueKey plus OffsetKey into ValueKey, starting at digit 'one to the right' = zeroth digit $PDAF(VK^C, OK^C)$ |
| 3 | $OK^1$ mod $OK^X = W^1$ | OFFSET KEY ADD MODE, OffsetKey plus ValueKey into OffsetKey, starting at digit 'one to the right' = zeroth digit $PDAF(OK^C, VK^C)$ |

NOTE:
*These cycle through as indicated in the default description above - these represent the first W created.

Thus, there are three separate equations to create the message key W. In the first case, the VK is modular added with the OK. Then, one of VK, OK is shifted with respect to the other—8 bits for example, and then the modular sum is again calculated. This process is repeated until all possible shifted combinations of VK, OK have been modular added.

In the second case, OK is used as a pointer into VK to select two values of VK to be modular added. Again, one of VK, OK is shifted with respect to the other—8 bits for example, and then the modular sum is again calculated. This process is repeated until all possible shifted combinations of VK, OK have been used to create the modular addition, i.e., the PDAF function of (VK, OK) for all possible shifted combinations.

In the third case, VK is used as a pointer into OK to select two values of OK to be modular added. Again, one of OK, VK is shifted with respect to the other—8 bits for example, and then the modular sum is again calculated. This process is repeated until all possible shifted combinations of OK, VK have been used to create the modular addition, i.e., the PDAF function of (OK, VK) for all possible shifted combinations.

Referring again to FIG. 3, shown therein is the Qwyit Stream Cipher and Key Exchange/Update (QCy™)

The system issues three credentials: an OpenID that identifies the user for whom the message is intended, and two keys (EK, QK).

The process to SEND a message then occurs as follows:
Initialization: Generate random salt Open Return (OR)—a public value.

Initialization Step:

$$QK \bmod OR=VK^P, PDAF(EK, VK^P)=VK^C$$

$$EK \bmod OR=OK^P, PDAF(QK, OK^P)=OK^C$$

Selection Step:

$$VK^{Pc[1\ldots n]}{}_{Pv[1\ldots n]} \bmod OK^{Po[1\ldots n]}=W_{1\ldots n}{}^2$$

Where pointers Pv and Po increment +1 through the entire key length for each cycle pointer Pc. If repeating, substitute $VK^{Next}$ and $OK^{Next}$ for each new cycle. There are two (2) additional/recommended PDAF Selection calculations set forth below.

Cipher Step:

$$W_{1\ldots n}{}^2 \oplus PT_{1\ldots n}{}^2 = CT_{1\ldots n}{}^2 \text{ repeating w/next cycle selection if more PT}$$

Update Step:

$$PDAF(OK^C, VK^P)=VK^{Next} \text{ and } PDAF(VK^C, OK^P)=OK^{Next}$$

Return to the selection step until there is no more data to send.
Message Step:
Send OpenID, OR and CT to Recipient
The process to RECEIVE a message then occurs as follows:
Using the received random salt Open Return (OR) and the previously issued credentials, EK, QK, calculate as follows:

$$QK \bmod OR=VK^P, PDAF(EK, VK^P)=VK^C$$

$$EK \bmod OR=OK^P, PDAF(QK, OK^P)=OK^C$$

Selection Step:

$$VK^{Pc[1\ldots n]}{}_{Pv[1\ldots n]} \bmod OK^{Po[1\ldots n]}=W_{1\ldots n}{}^2$$

Where pointers Pv and Po increment +1 through the entire key length for each cycle pointer Pc. If repeating, substitute $VK^{Next}$ and $OK^{Next}$ for each new cycle. There are two (2) additional/recommended PDAF Selection calculations set forth below.

Cipher Step:

$$W_{1\ldots n}{}^2 \oplus CT_{1\ldots n}{}^2 = PT_{1\ldots n}{}^2 \text{ repeating w/next cycle selection if more CT}$$

Update Step:

$$PDAF(OK^C, VK^P)=VK^{Next} \text{ and } PDAF(VK^C, OK^P)=OK^{Next}$$

Return to the selection step until there is no more data to send. There are two (2) additional/recommended PDAF Selection calculations set forth below.
Qwyit No Communication Key Update
There are two (2) ways to get new Start Keys for the protocol of the present invention, QCy™:
Static Update: Using an out-of-band channel, the participants will share new 512-bit upper level, Start Keys at known intervals. This distribution is a public event, making the length of each 512-bit message chain known.

Pseudo-Random Update: Using any number of digits from any number of locations (existing EK, QK, Last W, etc.), and based on their values as stated by either the participant pair or the system owners, auto-update the Start Keys (EK, QK) using any combination of one-way Qwyit® primitives (PDAF/OWC, and/or Combine/Extract)—without any communication between the participants.

For example:

(1) Take the first 4 odd digits ($1^{st}$, $3^{rd}$, $5^{th}$, $7^{th}$) from the current EK and MOD16 add them together ($1^{st}+3^{rd}$ and $2^{nd}+4^{th}$).

(2) At this interval, both participants (without communication between them) update the keys using a PDAF(EK, QK) to twice the size of their total length (e.g., if the EK and QK are 256-bits each, perform the PDAF to a length of 1024-bits.)

(3) Then perform an One-Way Cut (OWC) on this result, creating new EK, QK values (4) Use the new values for the next interval.

Other primitives may certainly be used and will maintain the underdetermined system; but the PDAF/OWC combination is 100% guaranteed, is an unsolvable one-way gate between key versions and is highly recommended. Using this Qwyit® key update method works for other secret key cryptosystems as well. The above updates can be performed forever without loss of entropy or key 'degradation' of any kind (certainly well beyond the update need in any real-world system).

It's also entirely simple and possible to pre-share an additional small set of random data (for example an extra 256-bits), that is used exclusively in either key update mode above to perform a PDAF with that small secret key and any-length of the existing key (and what to use can certainly be pseudo-randomly selected). This extra material would never be used in any W child/message key creations, extending the underdetermined system, and placing another one-way gate from any discovered messages or even stolen keys. This type of system flexibility is another example of the tremendous potential of the present invention.

While the obvious difficulty/management of no or nil Communication updates is staying in synch with a shared key partner/device, it's quite straightforward to devise system 'recovery' strategies/options/methods. An example is keeping a set of the last n-updates, returning to a previous version upon discovery of mismatched messages. Each would need to be analyzed for 'weaknesses' (such as forcing an update by message theft/destruction, etc.), and the bottom line is that the security and advantage of No Communication makes it more than worthwhile to overcome any usage difficulty.

QwyitKey™ ASU, AR and Messaging Example

The following comprises an example of the process flow for the complete QwyitKey™ system.
QwyitKey™ ASU Example
The ASU involves any Client who wants to join the QwyitKey™ secure messaging system, contacting the QwyitKey Anonymous Authentication Service/Server (QAAS). This process is most likely found, performed and managed within a Client Application participating in the QwyitKey™ community. The Client and QAAS process steps, and output, are as follows:
Client1
I just contacted the Qwyit.com QAAS to begin an ASU and join the Qwyit Community!

QAAS

I just Received an ASU start from Client1 (who selected the QwyitKey Registration link/button at the Qwyit.com website). Then, I'll generate an (or several) ASK(s); in this demo, just create a new ID as the one this Client1 will select. The Client1 ID is: DEEE92D5BEF39FDA. Click Continue in Client1 . . .

Next, create some new keys (ASK) for this Client1:
The Client1 MQK is: CD2290CFDBE306D3E-8C1A817E2A9484B05D43CFD71C4020CC467E91351-992AE1.
The Client1 MEK is: E23F7EB507B5EFE0E82399CE-03E9EFD2571EDB4BA5AAAB9A0F3B11ED983F18C3.
Click Continue in Client1.
This OpenID and the keys (together, the ASK) are provided in some manner to the client.
Click Continue in Client1.
ASU processing now switches to Client1.
Click Continue in Client1 . . .
Client1

ASU processing now continues here in Client1. Click Continue in Client1. First, create the AID, a random 16 digit (64-bits) number. The Client1 AID is: 1723812EA101B6DB. Next, use the QwyitCipher to send the Confirmation Salt (CS) in an encrypted ASUC3 message back to the QAAS. The Client1 Confirmation Salt is: C8CB3A5F85D89CA8DDFACA526BA56CEE. For this demo, all of the ciphertext is printed out in Hex format, because the textboxes do not show full bit representations—but all programming uses the bit values.
The Client1 ASUC3 message key is: CADA4481A12891F275E9EDC7252ACB6AD84E88E-24E59COD27244EFA2E82E5ADC.
The Client1 ASUC3 ciphertext is: 0079070307750D777904760000072070A73710378060-57605047773747501730 4.
Click Continue in Client1. Now send the encrypted ASUC3 confirmation message back to the QAAS.
[ASUC3: DEEE92D5BEF39FDA, 9C4CE77F9011FC8452485785BEF134FEFEC6AE355-27D99F56616DB839A0E2488, 1723812EA101B6DB, 0079070307750D777904760000072070A737103780605-76050477737475017304] sent using Port 4180 to the QAAS. ASU confirmation processing now switches to the QAAS
Click Continue in Client1.
QAAS ASU processing now continues here in QAAS. First step is to create the Confirmation CS using the PDAF of the last 32 digits (128-bits) of the MQK with the 1st 32 digits (128-bits) of the MEK. The Client1 Confirmation CS is: C8CB3A5F85D89CA8DDFACA526BA56CEE Click Continue in Client1. Next, use the QwyitCipher to decrypt the received Confirmation Salt from the ASUC3 message. The Client1 ASUC3 received message key is: CADA4481A12891F275E9EDC7252ACB6AD84E8-8E24E59COD27244EFA2E82E5ADC. The Client1 ASUC3 received plaintext, which is the received Confirmation CS decrypted, is: C8CB3A5F85D89CA8DDFACA526BA56CEE. Click Continue in Client1. Now compare the received with the computed . . . [Does C8CB3A5F85D89C-A8DDFACA526BA56CEE=C8CB3A5F85D89CA8DDF-ACA526BA56CEE?
As you can see, they are the same. Client1 info (just the OpenID and ASK with the AID listed publicly) is stored here in the QAAS as a viable user, and Client1 is now a Qwyit Community member. QAASU PROCESSING COMPLETE. Select CLEAR for next demonstration
Client1

After the processing is complete, the Client is reminded to check the public AID for accuracy. If there is a discrepancy, they should contact the QAAS. QAASU PROCESSING COMPLETE. Select CLEAR for next demonstration.
QwyitKey™ AR Example The AR involves any Client who wants to securely message with any other QwyitKey™ secure messaging system Client(s). In this example, the 'app' is configured to perform P2P secure messaging where Client1 contacts the QwyitKey Anonymous Authentication Service/Server (QAAS) and uses the service to authentically distribute Client1's newly created SSK (Session Start Key, in two parts, QK, EK) to their intended recipient, Client2—which is performed back through Client1 for Client2, secured by ASK keys only shared between Client2 and the QAAS. This process is performed without any end-user participation, simply as the start of their messaging to Client2. The Client1, QAAS and Client2 process steps, and output, are as follows:
Client1

I am going to message Client2. First, I need to perform an AR with the QAAS to distribute the shared start key that I have (or will 1st create) for use with Client2. Here is my current Client1 MQK: CD2290CFDBE306D3E8C-1A817E2A9484B05D43CFD71C4020CC467E91351-992AE1
Here is my current Client1 MEK: E23F7EB507B5E-FE0E82399CE03E9EFD2571EDB4BA5AAAB9A0F-3B11ED983F18C3
Here is my current Client1 AID: 9AB2F364FFDE61D7
Click Continue in Client1. First, I'll generate the new SSK to use with my intended recipient (Client2). This is a two part key, SQK, SEK. Here is the new Client1-2 SQK: 3A3613333633C08C4081D13B37CD7446491A777F97-8AE1EAA1B86D79EA5CDB1F
Here is the new Client1-2 SEK: 8CB33ED596B3091545B43566736C38F98518EB-BBCAF681DAC9C8CB311153961E
Click Continue in Client1. Now send the ARC1 encrypted to the QAAS where the plaintext is the ReceiverOpenID, SEK. The ReceiverOpenID for Client2 is: FEDCBA9876543210.
The Client1 ARC1 sent message key is: BDOB33776D8AF178F56FDBB6EB85CEED1F167-D2E3F80C476FE37D71666EF25BB
The Client1 ARC1 sent ciphertext, which is the ReceiverOpenID and our SEK (comma separated), both encrypted, is: 7703727A7A73080D06067307700405046 9627B000771-020701047F0E700B007F02700476730 77070040103040475750D037C0004740C07770072067-6030E7A000605737B700B7475057509 7073020E0E7770.
The ARC1 is [SenderOpenID, OR, Ciphertext]. The OR is 971BCE0D67225D7C462C1AC7B180FBCOCOOD9-DF64193B22A7097C1F99D6F4521. [ARC1: 6D6576B92F4A058E, 971BCE0D67225D7C462C-1AC7B180FBCOCOOD9DF64193B22A7097C1F99D6-F4521, 7703727A7A73080D06067307700405046 9627B00077-1020701047F0E700B007F02700476730 77070040103040475750D037C0004740C0777007206-76030E7A000605737B700B7475057509 7073020E0E7770] sent using Port 4180 to the QAAS. AR processing now switches to the QAAS. Click Continue in Client1.

QAAS

ARC1 processing now continues here in QAAS. First step is to decrypt the received ARC1 using QwyitCipher and the keys associated with the sending Client, in this case, Client1 The Client1 ARC1 received message key is: BD0B33776D8AF178F56FDBB6EB85CEED1F167D-2E3F80C476FE37D71666EF25BB.

The Client1 ARC1 received plaintext, which is the Receiver OpenID and the SEK, is: FEDCBA9876543210, 8CB33ED596B3091545B43566736C38F98518EBBBC-AF681DAC9C8CB311153961E.

Click Continue in Client1. Next, in Step 3, ARQ3, we create a 256-bit Qwyit Initialization Vector (QIV) for this messaging pair. The QIV is: 4D76A559E9C07A6BC944CD17A366A14A8A1FDB9-C86573807FC9E47332674B129.

Click Continue in Client1. Now create an Authentication Bundle (AB) for the Receiver Client using their ASK. This is done by first creating an AB-OR. The AB-OR is: 5951207692496C77DB79B97079E5DCEF33380C2EA-10EF9BCEC78A3FFBOB77575. The AB-OR is used to encrypt the AB, which is the Sender's AID, the SEK and the new QIV Click Continue in Client1. The Client2 AB encrypted message key is: 774085D113402111113C7F0114E1402F8D9232F0E-911E8D25270FF241740BB91.

The Client2 AB encrypted is: 7800730A7506720276007506030170721A160B7B03-050B7670700C06730A720F02717073717 5750D010F72050377000F737F790C070870717670727-872047C0776737A7D067B7274770008 700572000600731A610606730E7806767D7C0177720-27007727509067071760101020602002 0106797A74017E7D06007B7D060401040F04077E76-7D7405040703000706057300017A.

Click Continue in Client1. Now the ARQ3 is readied, using the Sender's ASK and a new OR, OR2. The OR2 is: 9363902EBAE784A0D32DCD6DE6CBB2944CFD4D0-23F01AD0649BB877A1ACDF79D.

The ARQ3 is: Sender OpenID, OR2, CT2 where CT2 is QIV, AB-OR, eAB.

The Client2 CT2 encrypted message key is: CF0FDC117CA39B214A6905C83CAD477F2986132-3CE21449443D80264593E3D5C.

The Client2 CT2 encrypted is: 777673730504767F7C0B7672047972737B7B700773-76727177720305747401737D7106020775 7C750903020E060B03767E757D04047375720370010-17602007A6E1101017674050073037B0 3700B0F7000727006057F00010703757F070374727D0-77507040002737777507727D700B757 30670050171017075720270717177027761E663A46444-B4D30303140364D3E313449442A243E 424133494445474E45314B4336354240313736313F344-A33413135423843474D483E3C32323 442404D3133493741423F393E4B4A3734324B32354-644453237592047474B3C3B3F474A394 0463647353533444C3536324E44333247354B304243-4B4244403B3F3444383E403447404C35 3649353C473C4635323446303C43354242.

The final ARQ3 is: 6D6576B92F4A058E, 9363902EBAE784A0D32DCD6DE6CBB2944CFD4D-023F01AD0649BB877A1ACDF79D, 777673730504767F7C0B7672047972737B7B70077376-72717772030574740173D7106020775 7C750903020E060B03767E757D040473757203700101-7602007A6E1101017674050073037B0 3700B0F7000727006057F00010703757F070374727D0-77507040002737777507727D700B757 30670050171017075720270717177027761E663A46444-B4D30303140364D3E313449442A243E 424133494445474E45314B4336354240313736313F344-A33413135423843474D483E3C32323 442404D3133493741423F393E4B4A3734324B32354-644453237592047474B3C3B3F474A394 0463647353533444C3536324E44333247354B304243-4B4244403B3F3444383E403447404C35 3649353C473C4635323446303C43354242.

AR processing now switches back to the contacting Client. Click Continue in Client1 . . .

Client1

Client1 now decrypts the ARQ3 using QwyitCipher to reveal the QIV, AB-OR, and the still-Client2-ASK encrypted AB. The Client1 ARQ3 received message key is: CF0FDC117CA39B214A6905C83CAD477F2986132-3CE21449443D80264593E3D5C.

The Client1 ARQ3 received plaintext, which is the QIV, AB-OR and the eAB, is: 4D76A559E9C07A6BC944CD17A366A14A8A1FD-B9C86573807FC9E47332674B129, 5951207692496C77DB79B97079E5DCEF33380C2EA-10EF9BCEC78A3FFBOB77575, x. Since Client1 can't read the eAB because it's only for Client2, it's shown still in ciphertext.

Click Continue in Client1. After sending (the QAAS), and receiving (Client1), both perform a PDAF PFS No communication ASK key update. This is accomplished using the MQK and MEK in a PDAF. Optionally, for a 1,024-bit length, and then performing an OWC to pare to 512-bits [This is not performed/shown here.] The AR is Complete. Now Client1 and 2 can message securely.

QAAS

The AR is Complete! Now Client1 and 2 can message securely and I am Finished. Click Continue in Client1.

Client1

Now I am going to talk to Client2 in our application. First, I'll send the 1st message to Client2—it is NOT encrypted, as all values are public or already encrypted. The QASM: SenderOpenID, AID, AB-OR, eAB.

QASM is: 6D6576B92F4A058E, 9AB2F364FFDE61D7, 5951207692496C77DB79B97079E5DCEF33380C2-EA10EF9BCEC78A3FFBOB77575, 7800730A7506720276007506030170721A160B7B030-50B7670700C06730A720F02717073717 5750D010F72050377000F737F790C070870717670727-7872047C0776737A7D067B7274770008 700572000600731A610606730E7806767D7C017772-02700772750906707176010102060200E02 0106797A74017E7D06007B7D060401040F04077E767-D7405040703000706057300017A.

Click Continue in Client1. Next, I'll send the Contextual Authentication content in a QAAM: SenderOpenID, ORa, eIMSG, and calculate the OpenReturnAuth for this QAAM message. ORa is: 77ACB88C1FF33AE70-9C59E42DA231580C329420B1DD119E19D46A4ACO-OCO8C38.

Click Continue in Client1. Now ready the message, which will be: Now is the time for all good men to come to the aid of the party. Then, encrypt it using QwyitCipher and the ORa . . .

The QAAM message key is: 4140066398C39FC3614E2C4380EC34F3536-98948677DF701E92450648954E9C4.

QwyitKey Authentication Message (QAAM) is 6D6576B92F4A058E, 77ACB88C1FF33AE709C59E42DA231580C329420-B1DD119E19D46A4AC00C08C38, 7A5E431059451647515D6347502B2613505E466553-2F58135F5F2A271359235D154759195B 56595D16435864325F5511245056145A561640505C1-544244B374D.

Now, QwyitKey messaging processing continues in Client 2. Click Continue in Client1.

Client2

I have just received two messages from Client1-the QASM and the QAAM . . . I'll process them. Using the QASM, I need to unwrap the Authentication Bundle from the QAAS . . .

The Client2 QASM received message key is: 774085D113402111113C7F0114E1402F8D9232F0E9-11E8D25270FF241740BB91.

The Client2 QASM received plaintext, which is the AID, the SEK and the QIV, is: 9AB2F364FFDE61D7, 8CB33ED596B3091545B43566736C38F98518EBBB-CAF681DAC9C8CB311153961E, 4D76A559E9C07A6BC944CD17A366A14A8A1FD-B9C86573807FC9E47332674B129.

Click Continue in Client1. Next, I need to unwrap the SSK. Now, perform the 1st QAAM decryption by using the just received ORa and revealed QIV (from the QASM) in a MOD16 decrypt to reveal the SQK: 3A3613333633C08C4081D13B37CD7446491A777F-978AE1EAA1B86D79EA5CDB1F.

Click Continue in Client1. Now, perform the 2nd QAAM decryption using the ORa and the new SSK to decrypt the eIMSG. The QAAM message key is: 4140066398C39FC3614E2C4380EC34F353698948677-DF701E92450648954E9C4.

QAAM plaintext message is "Now is the time for all good men to come to the aid of the party." Now both Client1 and I share the full SSK, have verified each other with the QAAM message contents, and can now send QwyitKey Normal Messages (QANM) back and forth.

All of the QANM messages are in the format: [QANM: OpenID, OR, CT] where CT is the Ciphertext of message contents. Click Continue in Client1 . . .

Now I'll reply back to Client1 . . . message is: Why won't anyone throw me a party with a cup cake for my birthday? OpenReturn Continuing for this message is: CC4FFB1DC4B1709A0127CF6C10E90066E8C7B007-77AE902FEAE5274B70F0D25A.

The first QANM message key is: C06C76F755508DA3F9F192C997C57CD903451C-C934F2DAC9109517FF8816C755

QAMN is FEDCBA9876543210, CC4FFB1DC4B1709A0127CF6C10E90066E8C7B00-777AE902FEAE5274B70F0D25A, 60583B65422D59663165575D48582F51174D51472-A45172F56155316445645364E14452C452 E17526355424817512452506123 2C41155A4014535A3-3465152223A0F.

Now, QwyitKey processing continues in Client 1. Click Continue in Client1 . . .

Client1

I've just received a QANM message from Client2 . . . I'll process it using our shared SSK keys and the sent Open Return! The QANM message key is: C06C76F755508DA3F9F192C997C57CD903451CC934-F2DAC9109517FF8816C755.

QANM plaintext message from Client 2 is "Why won't anyone throw me a party with a cup cake for my birthday?" Click Continue in Client1. After sending and receiving and the SSK key life is reached, both Clients perform a PDAF PFS ephemeral key update to create new Client Master Keys (CMK). This is accomplished using the SQK and SEK in a PDAF. Optionally, for a 1,024-bit length, and then performing an OWC to pare to 512-bits. First, here in Client 1. Click Continue in Client1. Here is the PDAF result for Client1 new CQK/CEK keys: 92B94003BA6FCBCD-5BC40E7F7B56BB2DB888F8276DD5BBBF5DA507-C3368B0C4766F9 744B46E7438F73E84871CBD403EEC28BD2F504425-B96BEE3903EA7FFOEBB6E7C466FOE 638707F7CD959F4D658DE0E0884FDC2E5072F79-C59C345B5860E43FA394EE747AB0C9F 7C1EA574DB371B542104ED467037CCD5D2E77E-269BBF3E7F32B9D66363F4CD53BD984 7CCA03BECF753A404E83591891B401B9084F9620-E27BB421AABE700479807251545A83E EEC4278B5E0DE1733789D4C2906ADD8D0140F706-9FF469A4D4B914F51AD2A1BBE2A0 EA9510595CB8AE1DOBEB90A8148F9E4C7B4ED0-00A1769433B4F732A22E576510E7B2C5 146324B844B4EE901C8D8FDE40.

Here is OWC final result for Client1 new CQK key: B443557900E62B6F3079326A2F7F93CBC8BFA577-A6C8713CE3F4460F91911EE6.

Here is OWC final result for Client1 new CEK key: 6683FE1454BFB60A8E1E138EB992577022D0B-DD6F65C0CB15D159638FC9D57B4.

Now, update the SSK in Client 2. Click Continue in Client1.

Client2

Here is the PDAF result for Client2 new CQK/CEK keys: 92B94003BA6FCBCD5BC40E7F7B56BB2DB888F82-76DD5BBBF5DA507C3368B0C4766F9 744B46E7438F73E84871CBD403EEC28BD2F50442-5B96BEE3903EA7FFOEBB6E7C466FOE 638707F7CD959F4D658DE0E0884FDC2E5072F79C-59C345B5860E43FA394EE747AB0C9F 7C1EA574DB371B542104ED467037CCD5D2E77E2-69BBF3E7F32B9D66363F4CD53BD984 7CCA03BECF753A404E83591891B401B9084F962-0E27BB421AABE700479807251545A83E EEC4278B5E0DE1733789D4C2906ADD8D0140F70-69FF469A4D4B914F51AD2A1BBE2A0 EA9510595CB8AE1DOBEB90A8148F9E4C7B4ED-000A1769433B4F732A22E576510E7B2C5 146324B844B4EE901C8D8FDE40.

Here is OWC final result for Client2 new CQK key: B443557900E62B6F3079326A2F7F93CBC8BFA5-77A6C8713CE3F4460F91911EE6.

Here is OWC final result for Client2 new CEK key: 6683FE1454BFB60A8E1E138EB992577022D0BD-D6F65C0CB15D159638FC9D57B4.

Click Continue in Client1.

Client1

This concludes the AR and QwyitKey demonstration. Thank you!

Client2

This concludes the AR and QwyitKey demonstration. Thank you!

QwyitKey™ ASU, AR and Messaging Code Calls

The following are the code calls for the example of the process flow for the complete QwyitKey™ system. These calls create the output, and those required to build the QwyitKey™ Anonymous Authentication Service, of the QwyitKey-Full-Example.exe app available from Qwyit LLC at www.qwyit.com. As explanation is provided above for the steps and output, only the corresponding code calls are included here:

QwyitKey™ ASU Example

Client1

Client, initiate ASU within the application (and as required/desired) with the QwyitKey Anonymous Authentication Service/Server (Step 1, ASUC1). Goto www.Qwyit.com/Qwyit where an HTTPS session will begin. This generates a ASU start on the MyQANONApp client application and the QAAS (ASUC1). Client app now awaits listing of key pairs and OpenIDs to select from (Or receipt of the Authentication Service Keys (ASK)).

QAAS

QAAS reply to client (Step 2-ASUQ2)

The client has submitted an ASU on the webpage, and is waiting the listing. Generate OpenID (recommend 16 digit, 64-bit unique IDs), ASK pairs (called the ASK) for client. Here, we'll generate the one set that was selected—a random, unique 16-hex digit, 64-bit OpenID.

sOpenID_Client1=GetRandom (16).

Generate random 512-bits that includes two (2) parts

Part 1: Master Qwyit Key (MQK, 64 hex digits, 256-bits) sClient1_MQK=GetRandom (64)

Part 2: Master Exchange Key (MEK, 64 hex digits, 256-bits) sClient1_MEK=GetRandom (64)

Client1

Client decrypt of reply and confirmation (Step 3, ASUC3)

Client will now send the Confirmation message (Step 3, ASUC3)

Client creates their Authentication Identity Number (AID), a 16-digit (64-bits) random value sClient1_AID=GetRandom (16)

Create the Confirmation Salt (CS) encrypted, in order to send to the QAAS

Perform the QwyitCipher using the MEK,MQK keys on the CS—Result is the CSe sClient1_CS=PubDS.PDAF(Right (sClient1_MQK, 32), 16, 0, Left(sClient1_MEK, 32), 1, 0, 0).

Now, perform the encryption pf the CS (resulting in CSe)

Begin by generating the OpenReturn to use.

sOpenReturn=GetRandom (64) 'return a 64-digit 256-bit random number

Encrypt sClient1_CS_encrypted (CSe)=PubDS.QwyitSCX (sClient1_MQK, sClient1_MEK, sOpenReturn, sClient1_CS)

Then Send (ASUC3) output (OpenID, OR, AID, CSe) to QAAS

Send [ASUC3: OpenID, OR, AID, CSe]

QAAS

Perform QwyitCipher using the ASK (found by sent OpenID) and reveal the message key (W) (Step 4-ASUQ4). Use message to decrypt Confirmation Salt (by creating the correct same CS and comparing)

PDAF of the last 32 digits (128-bits) of the MQK with the 1st 32 digits (128-bits) of the MEK; result is Confirmation CS generated sClient1_ConfirmationCS_qaas=PubDS.PDAF(Right (sClient1_MQK, 32), 16, 0, Left(sClient1_MEK, 32), 1, 0, 0)

Perform Qwyit decrypt using W and CSe, result is CS received decrypted (CS)

The sOpenReturn is used from the received ASUC3 message . . .

sClient1_ConfirmationCS_decrypted=PubDS.QwyitSCX (sClient1_MQK, sClient1_MEK, sOpenReturn, sCiphertext)

Compare CS received decrypted with CS generated

If sClient1_ConfirmationCS_qaas=sClient1_ConfirmationCS_decrypted Then If match confirmed, store IP Address, OpenID, ASK (No Other required session ID collected-QwyitKey is an ANONYMOUS join) into QAAS KDC-method?'

Else If doesn't match, error sent

THIS COMPLETES THE QAASU PROCESSING! (Client1 is reminded to check the public value!! (Step 5-ASUC5)

Client1

If no error returned, ASU PROCESSING COMPLETE!

QwyitKey™ AR Example

Client1

Client Sender sends Authorization Request to QAAS (Step 1, ARC1)

First, generate the new SSK to use with intended recipient sClient12_SQK=GetRandom (64)

sClient12_SEK=GetRandom (64)

Next generate the OR to use for this encrypted message (ARC1) send to the QAAS sOR1=GetRandom (64)

Encrypt the ARC1 (where the Plaintext is the Recipient OpenID and the SEK)

sClient1_CT1_encrypted=PubDS.QwitSCX (sClient1_MQK, sClient1_MEK, sOR1,, sPlaintext)

Send [ARC1: SenderOpenID, OR, CT] where CT is the now encrypted Recipient OpenID, SEK using Port 4180 to the QAAS

QAAS

QAAS decrypts ARC1 (Step 2, ARQ2)

Decrypt ARC1 from Client1 using respective OpenID and ASK in Qwyit Cipher

The sOpenReturn is used from the received ARC1 message; and the MQK and MEK are retrieved using the received sOpenID in the ARC1 sClient1_ARC1_decrypted=PubDS.QwitSCX (sClient1_MQK, sClient1_MEK, sOR1, sCiphertext)

Next, QAAS reply to Client1 (Step 3, ARQ3)

Create a new 256-bit Qwyit Initialization Vector (QIV) for this messaging pair

If bKeyType=True Then sQIV=GetRandom (64) [return a 64-digit 256-bit random number]

Next, create the Authentication Bundle for the Receiver Client using their ASK—This is done by first creating an AB-OR sAB_OR=GetRandom (64)

Else

Now use the AB-OR in QC to encrypt the AB, which is the Sender Client's (Client1) AID, the SEK and the new QIV The AB-OR is used to encrypt the AB . . .

sClient2_AB_e=PubDS.QwitSCX(sClient2_MQK, sClient2_MEK, sAB_OR,, aAB)

Then the ARQ3 is readied using the Sender's ASK with a new OR, OR2

The ARQ3 is Client1's OpenID, OR2, CT2 where the CT2 is QIV, AB-OR, eAB sOR2=GetRandom (64) 'return a 64-digit 256-bit random number
    sPlaintext=sQIV & "," & sAB_OR & "," & sClient2_AB_encrypted
    sClient1_AB_encrypted (eAB)=PubDS.QwitSCX (sClient1_MQK, sClient1_MEK, sOR2,, sPlaintext)
The ARQ3 is: Sender OpenID, OR2, CT2 where CT2 is QIV, AB-OR, eAB
Send ARQ3 back to Client1
Client1
Clients decrypts ARQ3 (Step 4, ARC4)—Sender Client1 decrypts ARQ3 from QAAS using ASK in Qwyit Cipher
'The sOpenReturn is used from the received ARQ3 message . . .
    sClient1_ARQ3_d=PubDS.QwyitSCX(sClient1_MQK, sClient1_MEK, sOR2,, sCiphertext)
QAAS and Client1 perform a PDAF PFS ephemeral DSK key update
Client1 will store the sOR2 and sCipherTextOut2_d, or hold in memory after receipt, for including in the following QASM and QAAN send to Client 2
Now, Client1 performs a PDAF PFS No communication ASK key update (QAAS will in the next section)
Perform a PDAF(MQK 256-bits, MEK 256-bits) for two rounds, creating 512-bit result w/MQK, MEK halves
Optionally, extend the above PDAF for 2 rounds (doubling length) and perform an OWC
    sClient1_Key_PFS_Update=PubDS.PDAF (sClient1_MQK, 256, 0, sClient1_MEK, 1, 0, 0)
    sClient1_MQK_MEK _New=PubDS.OWC (sClient1_Key_PFS _Update, 1)
    sClient1_MQK_New=Left(sClient1_MQK_MEK_New, 64)
    sClient1_MEK_New=Right (sClient1_MQK_MEK_New, 64)
QAAS
Performs the exact same PFS key updates for Client1—this can be done after performing the ARQ3 send . . . and no error returned . . . so 'wait time' is important, AND/OR performed immediately and stored differently, then handled by DB to update . . .
    sClient1_Key_PFS_Update=PubDS.PDAF (sClient1_MQK, 256, 0, sClient1_MEK, 1, 0, 0)
    sClient1_MQK_MEK_New=PubDS.OWC (sClient1_Key_PFS _Update, 1)
    sClient1_MQK_New=Left(sClient1_MQK_MEK_New, 64)
    sClient1_MEK_New=Right (sClient1_MQK_MEK_New, 64)
The AR is Complete! Now Client1 and 2 can message securely and QAAS is Finished! . . .
QwyitKey™ Messaging Example (continuing from the AR.)
Client1
Now I am going to talk to Client2 in our MyQTApp . . .
Sending Client sends QwyitKey Start Message to Client Receiver (QAStart Message, QASM)
Sending Client and Recipient will now exchange the QAAS ABe.
First, I'll send the 1st message (QASM) to Client2—it is NOT encrypted, as all values are public or already encrypted.
The QASM: SenderOpenID, AID, AB-OR, eAB
Sending Client also sends a QAAS Authentication Message (QAAM)
This message contains the Contextual Authentication content . . . which is 'How we know each other'

I'll send the Contextual Authentication content in a QAAM: SenderOpenID, ORa, eIMSG Calculate the ORauth value
    sORa=PubDS.MOD16(sClient12_SQK, sQIV)
Create new message content (IMSG, the Initial Message opening communication)
Then, encrypt it using QwyitCipher and the ORa . . . "
Perform QwyitKey messaging using Qwyit Cipher on IMSG with SSK (SQK and SEK)
    sIMSG="Now is the time for all good men to come to the aid of the party"
    sClient1_IMSG_e=PubDS.QwitSCX(sClient12_SQK, sClient12_SEK, sORa, sIMSG)
Send QAAM message (QAAM: OpenID, ORa, Ciphertext of IMSG)
[QAAM: OpenID, ORa, eIMSG]
Client2
Receiving Client decrypts QASM and QAAM
First, QASM decryption—using the ASK, AB-OR to decrypt the eAB
Reveals the AID, SEK for this Sending Client, and this pair's QAAS-created QIV
Use my ASK and the AB-OR to decrypt eAB
    sClient2_AB_d=PubDS.QwitSCX(sClient2_MQK, sClient2_MEK, sAB_OR,, sClient2 AB encrypted)
Here's the AID, SEK and QIV stripped out of the AB decrypted
    sClient1_AID_Recvd=Left(sClient2_AB_decrypted, 16)
    sClient1_SEK_Recvd=Mid(sClient2_AB_decrypted, 19, 64)
    sClient1_QIV_Recvd=Right(sClient2_AB_decrypted, 64)
Now QAAM 1st decryption: Perform the MOD16D to reveal the SQK (now have the full SSK)
    sClient2_SQK=PubDS.MOD16D(sORa, sClient1_QIV_Recvd)
Now, perform the QAAM 2nd decryption: Use ORa and the new SSK to decrypt the eIMSG
    sClient2_IMSG d=PubDS.QwyitSCX(sClient2_SQK, sClient1_SEK_Recvd, sORa,, sClient1_IMSG_encrypted)
Now both Client1 and I share the full SSK, have verified each other with the QAAM message contents, and can now send QwyitKey Normal Messages (QANM) back and forth!"
All of the QANM messages are in the format: [QANM: OpenID, OR, CT] where CT is the Ciphertext of message contents:
Now I'll reply back to Client1 . . . message is: Why won't anyone throw me a party with a cup cake for my birthday?
    sIMSG_2="Why won't anyone throw me a party with a cup cake for my birthday?"
First, Get an OR
    sOpenReturnC=GetRandom (64)
Then, encrypt the QANM contents
    sClient2_IMSG2_e=PubDS.QwitSCX(sClient2_SQK, sClient1_SEK_Recvd, sOpenReturnC, sIMSG_2)
Send QwyitKey QANM from within MyQTApp . . .
Send [QANM: OpenID, OpenReturnC, sClient2_ISMG2_e]
Client1
QANM Decrypt w/SSK (SQK, SEK) and received OpenReturnc in QwyitCipher to reveal secure message contents
    sClient2_IMSG_d=PubDS.QwyitSCX(sClient12_SQK, sClient12_SEK, sOpenReturnC,, sClient2_IMSG2_encrypted)
Reveal the QANM plaintext message from Client 2 (Why won't anyone throw me a party with a cup cake for my birthday?)

At known, sys defined SSK key life end (# of msgs, time, etc.), Clients perform a PDAF PFS No com key update to create new Client Master Keys (CQK,CEK)
Perform a PDAF(SQK 256-bits, SEK 256-bits) for two rounds, creating 512-bit CMK result w/SQK, SEK halves
Optionally, extend the above PDAF for 2 rounds (doubling length) and perform an OWC
    sClient1_Key_PFS_Update=PubDS.PDAF(sSQK_Client1, 256, 0, sSEK_Client1, 1, 0, 0)
    sClient1_CQK_CEK_New=PubDS.OWC (sClient1_Key_PFS_Update, 1)
    sClient1_CQK_New=Left(sClient1_CQK_CEK_New, 64)
    sClient1_CEK_New=Right(sClient1_CQK_CEK_New, 64)
Client2
At known, sys defined SSK key life end (# of msgs, time, etc.), Clients perform a PDAF PFS No com key update to create new Client Master Keys (CQK,CEK)
Perform a PDAF(SQK 256-bits, SEK 256-bits) for two rounds, creating 512-bit CMK result w/SQK, SEK halves
Optionally, extend the above PDAF for 2 rounds (doubling length) and perform an OWC
    sClient2_Key_PFS_Update=PubDS.PDAF(sSQK_Client2, 256, 0, sSEK_Client2, 1, 0, 0)
    sClient2_CQK_CEK_New=PubDS.OWC (sClient2_Key_PFS_Update, 1)
    sClient2_CQK_New=Left(sClient2_CQK_CEK_New, 64)
    sClient2_CEK_New=Right(sClient2_CQK_CEK_New, 64)
Client1
Continue as QANM above, including system defined PFS CMK updates
Client2
Continue as QANM above, including system defined PFS CMK updates

What is claimed is:

1. A method for operating an anonymous registration server as part of a participant-managed, independent-trust authentication service for secure messaging comprising:
    a) performing an anonymous registration by a server by:
receiving a setup request from a sender client for anonymous registration;
upon receiving the setup request, generating a sender client credentials for the sender client, said sender client credentials including a sender client open identification, a sender client first key and a sender client second key;
sending the sender client credentials to the sender client;
receiving a confirmation message from the sender client, which confirmation message includes the sender client open identification, a confirmation open return, a sender client generated authentication identification for publication by the server, and an encrypted confirmation salt generated by the sender client using a predetermined algorithm, wherein the encrypted confirmation salt is encrypted using the sender client first key, the sender client second key and the confirmation open return;
decrypting the encrypted confirmation salt using the sender client first key, the sender client second key and the confirmation open return to reveal the sender client generated confirmation salt;
generating a server generated confirmation salt using said predetermined algorithm and the sender client first key, and the sender client second key;
comparing the server generated confirmation salt to the sender client generated confirmation salt; and
upon determining that the server generated confirmation salt matches the sender client generated confirmation salt, publishing the sender client generated authentication identification; and
    b) performing an authentication request operation by the server by:
receiving an authentication request by the sender client for a recipient-only secure authentication bundle for use in initiating messaging operations between the sender client and a receiver client, wherein said authentication request includes the sender client open identification, an authentication request open return, and a first cipher text, which said first cipher text is encrypted using the sender client first key, the sender client second key and the authentication request open return, wherein the first cipher text includes a receiver client open identification and a first part of a session start key, and wherein a second part of the session start key is never received by the server;
decrypting the first cipher text using the sender client first key, the sender client second key and the authentication request open return to reveal the receiver client open identification and the first part of a session start key;
determining whether the receiver client open identification is valid;
if the receiver client open identification is valid, then:
    creating an initialization vector for the sender client and receiver client messaging pair;
    creating an authentication bundle for the receiver client, which authentication bundle includes the sender client authentication identification, the first part of the session start key, and the initialization vector;
encrypting the authentication bundle to create an encrypted authentication bundle using a receiver client first key, a receiver client second key, and an authentication bundle open return;
creating a second cipher text by encrypting the initialization vector, the authentication bundle open return, and the encrypted authentication bundle using the sender client first key, the sender client second key and an authentication reply open return; and
sending an authentication reply to the sender client, which authentication reply includes the sender open identification, the authentication reply open return, and the second cipher text; and
wherein the sender client generates both the first part of the session start key and a second part of the session start key but only sends the first part of the session start key to the server and never sends the second part of the session start key to any other party except to the receiver client.

2. The method according to claim 1, wherein the sender client generates a first part of the session start key and sends the first part of the session start key to the server and the sender client generates a second part of the session start key but only sends the second part of the session start key to the receiver client.

3. The method according to claim 1, wherein the sender client receives the authentication reply from the server and then:
    decrypts the second cipher text using the sender client first key, the sender client second key and the authentication reply open return to reveal the initialization vector, the authentication bundle open return, and the encrypted authentication bundle.

4. The method according to claim 3, wherein the sender client further:
sends an authentication start message to the receiver client, which authentication start message includes the sender open identification, the sender authentication identification, the authentication bundle open return, and the encrypted authentication bundle.

5. The method according to claim 4, wherein the sender client further:
performs a modular addition of the second part of the session start key and the initialization vector to obtain an open return authentication.

6. The method according to claim 5, wherein the sender client further:
sends an additional authentication message to the receiver client, which additional authentication message includes the sender client open identification, the open return authentication, and an encrypted initial message.

7. The method according to claim 6, wherein the sender client further:
encrypts an initial message to obtain the encrypted initial message using the first part of the session start key, the second part of the session start key and the open return authentication.

8. The method according to claim 3, wherein the sender client further:
performs a modular addition of the second part of the session start key and the initialization vector to obtain an open return authentication;
sends an authentication start message to the receiver client, which authentication start message includes the sender open identification, the sender authentication identification, the authentication bundle open return, the encrypted authentication bundle, the open return authentication, and an encrypted initial message.

9. The method according to claim 8, wherein the sender client further:
encrypts an initial message to obtain the encrypted initial message using the first part of the session start key, the second part of the session start key and the open return authentication.

10. The method according to claim 7, wherein the receiver client further:
decrypts the encrypted authentication bundle using the receiver client first key, the receiver client second key, and the authentication bundle open return to reveal the sender authentication identification sent from the server, the first part of the session start key, and the initialization vector.

11. The method according to claim 10, wherein the receiver client further:
performs an inverse modular addition of the open return authentication and the initialization vector to obtain the second part of the session start key.

12. The method according to claim 11, wherein the receiver client further:
decrypts the encrypted initial message using the first part of the session start key, the second part of the session start key and the open return authentication to reveal the initial message.

13. The method according to claim 12, wherein the sender client and receiver client subsequently communicate in an encrypted manner encrypting each new message using the first part of the session start key, the second part of the session start key and a new open return for each new message.

14. The method according to claim 11, wherein the receiver client further:
compares the sender authentication identification received from the sender client to the sender authentication identification received encrypted from the server in the encrypted authentication bundle.

15. The method according to claim 14, wherein the receiver client further:
compares the sender authentication identification received from the sender client and the sender authentication identification received encrypted from the server in the encrypted authentication bundle to a published version of the sender authentication identification that is published by the server in association with the sender open identification.

16. The method according to claim 13, wherein the receiver client and the sender client at predetermined key end of lifetime further:
perform two rounds of a position digit algebraic function operation using the first part of the session start key and the second part of the session start key to create a first part of a client master key, and a second part of a client master key, which are then used in subsequent encryption operations between the sender and receiver clients.

17. The method according to claim 13, wherein the receiver client and the sender client at predetermined intervals further:
perform four rounds of a position digit algebraic function operation using the first part of the session start key and the second part of the session start key to create double length keys, followed by a one way cut function to create a first part of a client master key, and a second part of a client master key, which are then used in subsequent encryption operations between the sender and receiver clients.

18. The method according to claim 1, wherein the sender client and the server at predetermined intervals further:
perform two rounds of a position digit algebraic function operation using the sender client first key and the sender client second key to create a sender client first master key, and a sender client second master key, which are then used in subsequent encryption operations between the sender client and the server.

19. The method according to claim 1, wherein the sender client and the server at predetermined key end of lifetime further:
perform four rounds of a position digit algebraic function operation using the sender client first key and the sender client second key to create double length keys, followed by a one way cut function to create a sender client first master key, and a sender client second master key, which are then used in subsequent encryption operations between the sender client and the server.

* * * * *